United States Patent
Lang et al.

(10) Patent No.: US 11,433,629 B2
(45) Date of Patent: Sep. 6, 2022

(54) METHOD FOR PREPARING SILICONE HYDROGELS

(71) Applicant: Alcon Inc., Fribourg (CH)

(72) Inventors: Weihong Lang, Suwanee, GA (US); Wei Liang, Johns Creek, GA (US); Ying Zheng, Suwanee, GA (US); Karen Belinda Sentell, Alpharetta, GA (US); Richard Charles Breitkopf, Dunwoody, GA (US); Daqing Wu, Suwanee, GA (US); Steve Yun Zhang, Sugar Hill, GA (US)

(73) Assignee: Alcon Inc., Fribourg (CH)

(*) Notice: Subject to any disclaimer, the term of this patent is extended or adjusted under 35 U.S.C. 154(b) by 750 days.

(21) Appl. No.: 16/429,776

(22) Filed: Jun. 3, 2019

(65) Prior Publication Data

US 2019/0366658 A1     Dec. 5, 2019

Related U.S. Application Data

(60) Provisional application No. 62/680,001, filed on Jun. 4, 2018.

(51) Int. Cl.
| | |
|---|---|
| *B29D 11/00* | (2006.01) |
| *G02B 1/04* | (2006.01) |
| *B29K 83/00* | (2006.01) |
| *B29K 105/00* | (2006.01) |

(52) U.S. Cl.
CPC ........ *B29D 11/00134* (2013.01); *G02B 1/043* (2013.01); *B29K 2083/00* (2013.01); *B29K 2105/0061* (2013.01)

(58) Field of Classification Search
CPC combination set(s) only.
See application file for complete search history.

(56) References Cited

U.S. PATENT DOCUMENTS

| | | |
|---|---|---|
| 4,136,250 A | 1/1979 | Mueller |
| 4,153,641 A | 5/1979 | Deichert et al. |
| 4,182,822 A | 1/1980 | Chang |
| 4,189,546 A | 2/1980 | Deichert et al. |
| 4,254,248 A | 3/1981 | Friends et al. |
| 4,259,467 A | 3/1981 | Keogh et al. |
| 4,260,725 A | 4/1981 | Keogh et al. |
| 4,261,875 A | 4/1981 | LeBoeuf |
| 4,276,402 A | 6/1981 | Chromecek et al. |

(Continued)

*Primary Examiner* — Peter A Salamon
(74) *Attorney, Agent, or Firm* — Jian Zhou

(57) ABSTRACT

The invention provides a contact lens manufacturing method for cast-molding of silicone hydrogel contact lenses having enhanced oxygen permeability without adversely affecting desirable lens mechanical properties (e.g., modulus). A method of the invention comprises adding a small amount of a radical scavenger (e.g., H-TEMPO) in a polymerizable composition for cast-molding of SiHy contact lenses) to provide the resultant polymerizable composition with a bi-phase curing profile at a curing temperature of from about 45° C. to about 100° C. With such a bi-phase curing profile, the resultant polymerizable composition can be thermally cured at the curing temperature to form a SiHy contact lens having an oxygen permeability higher than that for a polymerizable composition having the substantially identical composition excepting being free of any radical scavenger.

20 Claims, 5 Drawing Sheets

(56) References Cited

U.S. PATENT DOCUMENTS

| | | |
|---|---|---|
| 4,327,203 A | 4/1982 | Deichert et al. |
| 4,341,889 A | 7/1982 | Deichert et al. |
| 4,343,927 A | 8/1982 | Chang |
| 4,355,147 A | 10/1982 | Deichert et al. |
| 4,444,711 A | 4/1984 | Schad |
| 4,460,534 A | 7/1984 | Boehm et al. |
| 4,486,577 A | 12/1984 | Mueller et al. |
| 4,543,398 A | 9/1985 | Bany et al. |
| 4,605,712 A | 8/1986 | Mueller et al. |
| 4,661,575 A | 4/1987 | Tom |
| 4,684,538 A | 8/1987 | Klemarczyk |
| 4,703,097 A | 10/1987 | Wingler et al. |
| 4,833,218 A | 5/1989 | Lee |
| 4,837,289 A | 6/1989 | Mueller et al. |
| 4,954,586 A | 9/1990 | Toyoshima et al. |
| 4,954,587 A * | 9/1990 | Mueller ............ A61L 26/0014 526/279 |
| 5,010,141 A | 4/1991 | Mueller |
| 5,034,461 A | 7/1991 | Lai et al. |
| 5,039,761 A | 8/1991 | Ono et al. |
| 5,070,170 A | 12/1991 | Robertson et al. |
| 5,070,215 A | 12/1991 | Bambury et al. |
| 5,079,319 A | 1/1992 | Mueller |
| 5,346,946 A | 9/1994 | Yokoyama et al. |
| 5,358,995 A * | 10/1994 | Lai ..................... C08F 230/08 526/279 |
| 5,387,632 A | 2/1995 | Lai et al. |
| 5,416,132 A | 5/1995 | Yokoyama et al. |
| 5,449,729 A | 9/1995 | Lai |
| 5,451,617 A | 9/1995 | Lai et al. |
| 5,486,579 A | 1/1996 | Lai et al. |
| 5,760,100 A | 6/1998 | Nicolson et al. |
| 5,843,346 A | 12/1998 | Morrill |
| 5,894,002 A | 4/1999 | Boneberger et al. |
| 5,962,548 A | 10/1999 | Vanderlaan et al. |
| 5,981,675 A * | 11/1999 | Valint, Jr. ............ C08F 290/04 526/279 |
| 6,039,913 A | 3/2000 | Hirt et al. |
| 6,166,236 A | 12/2000 | Bambury |
| 6,762,264 B2 | 7/2004 | Kuenzler et al. |
| 6,867,245 B2 | 3/2005 | Iwata et al. |
| 7,214,809 B2 | 5/2007 | Zanini et al. |
| 7,423,074 B2 | 9/2008 | Lai |
| 7,671,156 B2 * | 3/2010 | Phelan .................. G02B 1/043 524/588 |
| 8,415,405 B2 * | 4/2013 | Maggio ................. G02B 1/043 556/419 |
| 8,475,529 B2 | 7/2013 | Clarke |
| 8,501,833 B2 * | 8/2013 | Phelan ................. C08F 290/14 523/107 |
| 8,529,057 B2 | 9/2013 | Qiu et al. |
| 8,614,261 B2 | 12/2013 | Iwata et al. |
| 8,658,748 B2 | 2/2014 | Liu |
| 8,993,651 B2 | 3/2015 | Chang et al. |
| 9,097,840 B2 | 8/2015 | Chang |
| 9,103,965 B2 | 8/2015 | Chang |
| 9,217,813 B2 * | 12/2015 | Liu ................. B29D 11/00125 |
| 9,315,669 B2 | 4/2016 | Holland |
| 9,475,827 B2 | 10/2016 | Chang |
| 2012/0026457 A1 | 2/2012 | Qiu |
| 2012/0088843 A1 | 4/2012 | Chang |
| 2012/0088844 A1 | 4/2012 | Kuyu |
| 2015/0094393 A1 | 4/2015 | Holland |
| 2017/0166673 A1 | 6/2017 | Huang |
| 2018/0081197 A1 | 3/2018 | Qiu |
| 2018/0100038 A1 | 4/2018 | Jing |
| 2018/0100053 A1 | 4/2018 | Jing |
| 2019/0366658 A1 * | 12/2019 | Lang .................... C09D 183/10 |

* cited by examiner

METHOD FOR PREPARING SILICONE HYDROGELS

This application claims the benefit under 35 USC § 119 (e) of U.S. provisional application No. 62/680,001 filed 4 Jun. 2018, herein incorporated by reference in its entirety.

The present invention is related to a method for preparing silicone hydrogel material with enhanced oxygen permeability without adverse impacts on lens mechanical properties.

BACKGROUND OF THE INVENTION

Silicone hydrogel (SiHy) contact lenses are made of a hydrated, crosslinked polymeric material that contains silicone and a certain amount of water within the lens polymer matrix at equilibrium. They are increasingly becoming popular, because of corneal health benefits provided by their high oxygen permeability. Although incorporation of silicone in a contact lens material can provide the contact lens with high oxygen permeability, it can also have undesirable effects on the hydrophilicity and wettability of SiHy contact lenses, because silicon is hydrophobic and has a great tendency to migrate onto the lens surface being exposed to air. It would be desirable to have a manufacturing process for producing SiHy contact lenses with enhanced oxygen permeability without adverse impacts on desired mechanical properties.

U.S. Pat. No. 7,671,156 discloses a bulk polymerization method for making SiHy materials suitable for lathing at room temperature, in which a relatively low amount (e.g., less than about 1%) of a chain transfer agent can be added in a polymerizable composition so as to provide a resultant silicone hydrogel material with a reduced elastic modulus while increasing or minimally impacting oxygen permeability.

U.S. Pat. No. 8,501,833 disclose that by adding an organonitroxide to a polymerizable composition for making SiHy materials in an amount to have a selected ratio of percentage by weight of the organonitroxide to the radical initiator in the polymerizable composition, the polymerization composition can be cured in tubes at an elevated temperature to form SiHy rods which are substantially free of defects, such as, cracks and voids) and have consistent properties (e.g., oxygen permeability, ion permeability, water content, elastic modulus, and/or elongation).

SUMMARY OF THE INVENTION

The present invention, in one aspect, provides a method of making SiHy contact lenses. The method of the invention comprises: (1) obtaining a polymerizable composition which is clear at room temperature, wherein the polymerizable composition comprises (a) at least one siloxane-containing vinylic monomer, (b) at least one polysiloxane vinylic crosslinker, (c) from about 15% to about 55% by weight of at least one hydrophilic (meth)acrylamido monomer having 3 to 8 carbon atoms, (d) from 0 to about 25% by weight of an organic solvent having 2 to 8 carbon atoms relative to the total weight of the polymerizable composition, (e) at least one thermal free radical initiator, and (f) at least one radical scavenger present in an amount for providing the polymerizable composition with a bi-phase curing profile determined by using thermal DSC (Differential scanning calorimetry) to polymerization kinetics of the polymerizable composition at a curing temperature of from about 45° C. to about 100° C. as function of time; (2) introducing the polymerizable composition into a lens mold, wherein the lens mold comprises a male mold half having a first molding surface and a female mold half having a second molding surface, wherein the male and female mold halves are configured to receive each other such that a mold cavity is formed between the first and second molding surfaces when the mold is closed; (3) curing thermally the polymerizable composition in the lens mold in an oven at the curing temperatures for at least 30 minutes to form an unprocessed silicone hydrogel lens contact lens; (4) separating the lens mold into the male and female mold halves, with the unprocessed silicone hydrogel contact lens being adhered on a lens-adhered mold half which is one of the male and female mold halves; and (5) removing the unprocessed silicone hydrogel contact lens from the lens-adhered mold half.

DESCRIPTION OF PREFERRED EMBODIMENTS

Figure 1:
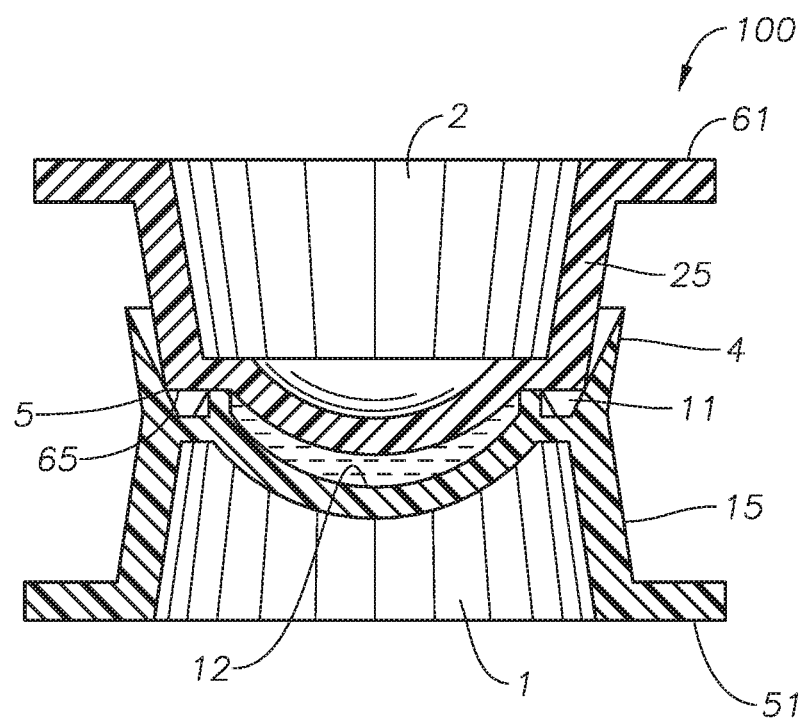
FIG. 1 is a cross-sectional view of a mold according to a preferred embodiment of the invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

"About" as used herein in this application means that a number, which is referred to as "about", comprises the recited number plus or minus 1-10% of that recited number.

A "hydrogel" or "hydrogel material" refers to a cross-linked polymeric material which has three-dimensional polymer networks (i.e., polymer matrix), is insoluble in water, but can hold at least 10% by weight of water in its polymer matrix when it is fully hydrated (or equilibrated).

A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

As used in this application, the term "non-silicone hydrogel" refers to a hydrogel that is theoretically free of silicon.

"Hydrophilic," as used herein, describes a material or portion thereof that will more readily associate with water than with lipids.

The term "room temperature" refers to a temperature of about 21° C. to about 27° C.

The term "soluble", in reference to a compound or material in a solvent, means that the compound or material can be dissolved in the solvent to give a solution with a concentration of at least about 0.5% by weight at room temperature.

The term "insoluble", in reference to a compound or material in a solvent, means that the compound or material can be dissolved in the solvent to give a solution with a concentration of less than 0.05% by weight at room temperature.

A "vinylic monomer" refers to a compound that has one sole ethylenically unsaturated group, is soluble in a solvent, and can be polymerized actinically or thermally.

As used in this application, the term "ethylenically unsaturated group" is employed herein in a broad sense and is intended to encompass any groups containing at least one >C=C< group. Exemplary ethylenically unsaturated groups include without limitation (meth)acryloyl

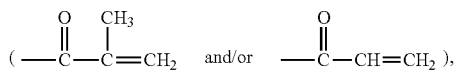

allyl, vinyl, styrenyl, or other C=C containing groups.

An "acrylic monomer" refers to a vinylic monomer having one sole (meth)acryloyl group. Examples of acrylic monomers includes (meth)acryloxy [or(meth)acryloyloxy] monomers and (meth)acrylamido monomers.

An "(meth)acryloxy monomer" or "(meth)acryloyloxy monomer" refers to a vinylic monomer having one sole group of

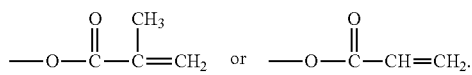

An "(meth)acrylamido monomer" refers to a vinylic monomer having one sole group of

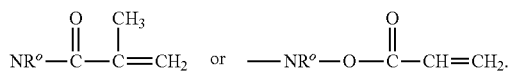

in which $R^o$ is H or $C_1$-$C_4$ alkyl.

The term "(meth)acrylamide" refers to methacrylamide and/or acrylamide.

The term "(meth)acrylate" refers to methacrylate and/or acrylate.

An "N-vinyl amide monomer" refers to an amide compound having a vinyl group (—CH=$CH_2$) that is directly attached to the nitrogen atom of the amide group.

The term "terminal (meth)acryloyl group" refers to one (meth)acryloyl group at one of the two ends of the main chain (or backbone) of an organic compound as known to a person skilled in the art.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionizing radiation (e.g. gamma ray or X-ray irradiation), microwave irradiation, and the like. Thermal curing or actinic curing methods are well-known to a person skilled in the art.

A "hydrophilic vinylic monomer", a "hydrophilic acrylic monomer", a "hydrophilic (meth)acryloxy monomer", or a "hydrophilic (meth)acrylamido monomer", as used herein, respectively refers to a vinylic monomer, an acrylic monomer, a (meth)acryloxy monomer, or a (meth)acrylamido monomer), which typically yields a homopolymer that is water-soluble or can absorb at least 10 percent by weight of water.

A "hydrophobic vinylic monomer", a "hydrophobic acrylic monomer", a "hydrophobic (meth)acryloxy monomer", or a "hydrophobic (meth)acrylamido monomer", as used herein, respectively refers to a vinylic monomer, an acrylic monomer, a (meth)acryloxy monomer, or a (meth)acrylamido monomer), which typically yields a homopolymer that is insoluble in water and can absorb less than 10% by weight of water.

As used in this application, the term "vinylic crosslinker" refers to an organic compound having at least two ethylenically unsaturated groups. A "vinylic crosslinking agent" refers to a vinylic crosslinker having a molecular weight of 700 Daltons or less.

As used in this application, the term "polymer" means a material formed by polymerizing/crosslinking one or more monomers or macromers or prepolymers or combinations thereof.

As used in this application, the term "molecular weight" of a polymeric material (including monomeric or macromeric materials) refers to the number average molecular weight unless otherwise specifically noted or unless testing conditions indicate otherwise.

A "polysiloxane segment" refers to a polymer chain consisting of at least three consecutively- and directly-linked siloxane units (divalent radical) each independent of one another having a formula of

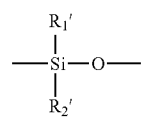

in which $R_1'$ and $R_2'$ are two substituents independently selected from the group consisting of $C_1$-$C_{10}$-alkyl, $C_1$-$C_4$-alkyl- or $C_1$-$C_4$-alkoxy-substituted phenyl, $C_1$-$C_{10}$ fluoroalkyl, $C_1$-$C_{10}$ fluoroether, $C_6$-$C_{18}$ aryl radical, -alk-($OC_2H_4$)$_{\gamma1}$—$OR^o$ (in which alk is $C_1$-$C_6$ alkyl diradical, $R^o$ is H or $C_1$-$C_4$ alkyl and $\gamma1$ is an integer from 1 to 10), a $C_2$-$C_{40}$ organic radical having at least one functional group selected from the group consisting of hydroxyl group (—OH), carboxyl group (—COOH), —$NR_3'R_4'$, amino linkages of —$NR_3'$—, amide linkages of —$CONR_3'$—, amide of —$CONR_3'R_4'$, urethane linkages of —OCONH—, and $C_1$-$C_4$ alkoxy group, or a linear hydrophilic polymer chain, in which $R_3'$ and $R_4'$ independent of each other are hydrogen or a $C_1$-$C_{15}$ alkyl.

A "polysiloxane vinylic crosslinker" refers to a compound comprising at least one polysiloxane segment and at least two ethylenically-unsaturated groups.

A "linear polysiloxane vinylic crosslinker" refers to a compound comprising a main chain which includes at least one polysiloxane segment and is terminated with one ethylenically-unsaturated group at each of the two ends of the main chain.

A "chain-extended polysiloxane vinylic crosslinker" refers to a compound comprising at least two ethylenically-unsaturated groups and at least two polysiloxane segments each pair of which is linked by one divalent radical.

The term "fluid" as used herein indicates that a material is capable of flowing like a liquid.

The term "room temperature" refers to a temperature of about 21° C. to about 27° C.

As used in this application, the term "clear" in reference to a polymerizable composition means that the polymerizable composition is a transparent solution or liquid mixture (i.e., having a light transmissibility of 85% or greater, preferably 90% or greater in the range between 400 to 700 nm).

The term "alkyl" refers to a monovalent radical obtained by removing a hydrogen atom from a linear or branched alkane compound. An alkyl group (radical) forms one bond with one other group in an organic compound.

The term "alkylene divalent group" or "alkylene diradical" or "alkyl diradical" interchangeably refers to a divalent radical obtained by removing one hydrogen atom from an alkyl. An alkylene divalent group forms two bonds with other groups in an organic compound.

The term "alkoxy" or "alkoxyl" refers to a monovalent radical obtained by removing the hydrogen atom from the hydroxyl group of a linear or branched alkyl alcohol. An alkoxy group (radical) forms one bond with one other group in an organic compound.

In this application, the term "substituted" in reference to an alkyl diradical or an alkyl radical means that the alkyl diradical or the alkyl radical comprises at least one substituent which replaces one hydrogen atom of the alkyl diradical or the alkyl radical and is selected from the group consisting of hydroxyl (—OH), carboxyl (—COOH), —NH$_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, and combinations thereof.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates free radical crosslinking/polymerizing reaction by the use of heat energy.

"Post-curing surface treatment", in reference to a silicone hydrogel bulk material or a SiHy contact lens, means a surface treatment process that is performed after the silicone hydrogel bulk material or the SiHy contact lens is formed by curing (i.e., thermally or actinically polymerizing) a SiHy lens formulation. A "SiHy lens formulation" refers to a polymerizable composition that comprises all necessary polymerizable components for producing a SiHy contact lens or a SiHy lens bulk material as well known to a person skilled in the art.

A "non-optical surface of a mold half" refers to mold half surface which does not contact the lens forming material during cast molding of a contact lens.

The invention is generally related to a contact lens manufacturing method for cast-molding of silicone hydrogel contact lenses having enhanced oxygen permeability without adversely affecting desirable lens mechanical properties (e.g., modulus). The invention is partly based on the discovery that when a small amount of a radical scavenger can be added in a SiHy lens formulation (i.e., a polymerizable composition for cast-molding of SiHy contact lenses), the resultant SiHy lens formulation can have a bi-phase curing profile as determined by using thermal DSC (Differential scanning calorimetry) to determine the curing (polymerization) kinetics of the polymerizable composition at a curing temperature of from about 45° C. to about 100° C. as function of time. With such a bi-phase curing profile, the SiHy lens formulation can be thermally cured at the curing temperature to form a SiHy contact lens having an oxygen permeability higher than that for a SiHy lens formulation having the substantially identical composition excepting being free of any radical scavenger. This method of the invention can be easily implemented in the production of SiHy contact lenses having a desired oxygen permeability from a SiHy lens formulation with a minimized amount of silicone-containing polymerizable components.

The present invention provides a method for producing silicone hydrogel contact lenses, comprising the step of: (1) obtaining a polymerizable composition which is clear at room temperature, wherein the polymerizable composition comprises (a) at least one siloxane-containing vinylic monomer, (b) at least one polysiloxane vinylic crosslinker, (c) from about 15% to about 55% (preferably from about 20% to about 50%, more preferably from about 25% to about 45%) by weight of at least one hydrophilic (meth)acrylamido monomer having 3 to 8 carbon atoms, (d) from 0 to about 25% (preferably 1% to about 20%, more preferably from about 2% to about 15%, even more preferably from about 3% to about 10%) by weight of an organic solvent having 2 to 8 carbon atoms relative to the total weight of the polymerizable composition, (e) at least one thermal free radical initiator, and (f) at least one radical scavenger present in an amount (preferably at least about 100 ppm, more preferably at least about 200 ppm, even more preferably at least about 300 ppm, relative to the total weight of the polymerizable composition) for providing the polymerizable composition with a bi-phase curing profile determined by using thermal DSC to polymerization kinetics of the polymerizable composition at a curing temperature of from about 45° C. to about 100° C. as function of time; (2) introducing the polymerizable composition into a lens mold, wherein the lens mold comprises a male mold half having a first molding surface and a female mold half having a second molding surface, wherein the male and female mold halves are configured to receive each other such that a mold cavity is formed between the first and second molding surfaces when the mold is closed; (3) curing thermally the polymerizable composition in the lens mold in an oven at the curing temperatures for at least 30 minutes (preferably at least about 40 minutes, more preferably at least about 50 minutes, even more preferably at least about 60 minutes) to form an unprocessed silicone hydrogel lens contact lens; (4) separating the lens mold into the male and female mold halves, with the unprocessed silicone hydrogel contact lens being adhered on a lens-adhered mold half which is one of the male and female mold halves; and (5) removing the unprocessed silicone hydrogel contact lens from the lens-adhered mold half.

In a preferred embodiment, step (5) (i.e., the step of removing) is preferably performed, before the unprocessed silicone hydrogel contact lens is contact with water or any liquid, by (a) bring a ultrasonic horn in direct contact with at least one area of a non-optical surface of the lens-adhered mold half having the unprocessed silicone hydrogel lens precursor attached thereon and (b) applying a ultrasonic vibrational energy of from about 0.2 to about 18 J to the at least one area of the non-optical surface of the lens-adhered mold half having the unprocessed silicone hydrogel contact lens adhered thereon so as to remove the unprocessed silicone hydrogel contact lens from the lens-adhered mold half. More preferably, the method further comprises a step of (i.e., step (6)): subjecting the unprocessed silicone hydrogel contact lens to one or more post-molding processes selected from the group consisting of extraction, hydration, surface treatment, packaging, sterilization, and combinations thereof.

In a preferred embodiment, the sum of the amounts of components (a) to (d) is at least about 90% (preferably at least about 93%, more preferably at least about 95%, even more preferably at least about 98%) by weight relative to the total weight of the polymerizable composition.

In accordance with the invention, a siloxane-containing vinylic monomer can be any vinylic monomer of formula (M1) or (M2)

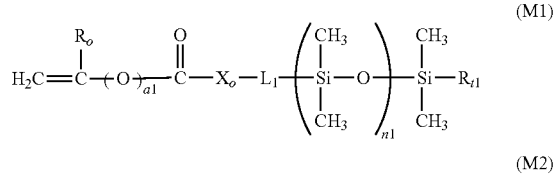

(M1)

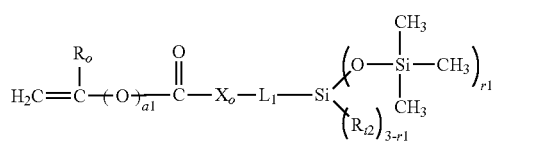

(M2)

in which: a1 is zero or 1; $R_o$ is H or methyl; $X_o$ is O or $NR_1$; $L_1$ is a $C_2$-$C_8$ alkylene divalent radical or a divalent radical of

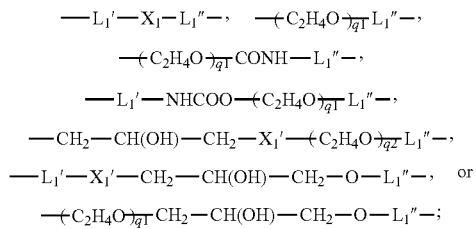

$L_1'$ is a $C_2$-$C_8$ alkylene divalent radical which has zero or one hydroxyl group; $L_1''$ is $C_3$-$C_8$ alkylene divalent radical which has zero or one hydroxyl group; $X_1$ is O, $NR_1$, NHCOO, OCONH, $CONR_1$, or $NR_1CO$; $R_1$ is H or a $C_1$-$C_4$ alkyl having 0 to 2 hydroxyl group; $R_{t1}$ and $R_{t2}$ independent of each other are a $C_1$-$C_4$ alkyl; $X_1'$ is O or $NR_1$; q1 is an integer of 1 to 20; q2 is an integer of 0 to 20; n1 is an integer of 3 to 25; and r1 is an integer of 2 or 3.

Examples of preferred siloxane-containing vinylic monomers of formula (M1) include without limitation α-(meth)acryloxypropyl terminated ω-$C_1$-$C_4$-alkyl terminated polydimethylsiloxane, α-(meth)acryloxy-2-hydroxypropyloxypropyl terminated ω-$C_1$-$C_4$-alkyl terminated polydimethylsiloxane, α-(2-hydroxyl-methacryloxypropyloxypropyl)-ω-$C_1$-$C_4$-alkyl-decamethylpentasiloxane, α-[3-(meth)acryloxyethoxy-2-hydroxypropyloxypropyl]-terminated ω-$C_1$-$C_4$-alkyl terminated polydimethylsiloxane, α-[3-(meth)acryloxy-propyloxy-2-hydroxypropyloxypropyl]-terminated ω-$C_1$-$C_4$-alkyl terminated polydimethylsiloxane, α-[3-(meth)acryloxyisopropyloxy-2-hydroxypropyloxypropyl]-terminated ω-$C_1$-$C_4$-alkyl terminated polydimethylsiloxane, α-[3-(meth)acryloxybutyloxy-2-hydroxypropyloxypropyl]-terminated ω—$C_1$-$C_4$-alkyl terminated polydimethylsiloxane, α-[3-(meth)acryloxyethylamino-2-hydroxypropyloxypropyl]-terminated ω-$C_1$-$C_4$-alkyl terminated polydimethylsiloxane, α-[3-(meth)acryloxypropylamino-2-hydroxypropyloxypropyl]-terminated ω-$C_1$-$C_4$-alkyl terminated polydimethylsiloxane, α-[3-(meth)acryloxy-butylamino-2-hydroxypropyloxypropyl]-terminated ω-$C_1$-$C_4$-alkyl terminated polydimethylsiloxane, α-[(meth)acryloxy(polyethylenoxy)-2-hydroxypropyloxypropyl]-terminated ω-$C_1$-$C_4$-alkyl terminated polydimethylsiloxane, α-[(meth)acryloxy-2-hydroxypropyloxy-ethoxypropyl]-terminated ω-$C_1$-$C_4$-alkyl terminated polydimethylsiloxane, α-[(meth)acryloxy-2-hydroxypropyl-N-ethylaminopropyl]-terminated ω—$C_1$-$C_4$-alkyl terminated polydimethylsiloxane, α-[(meth)acryloxy-2-hydroxypropyl-aminopropyl]-terminated ω-$C_1$-$C_4$-alkyl terminated polydimethylsiloxane, α-[(meth)acryloxy-2-hydroxypropyloxy-(polyethylenoxy)propyl]-terminated ω-$C_1$-$C_4$-alkyl terminated polydimethylsiloxane, α-(meth)acryloylamidopropyloxypropyl terminated ω-$C_1$-$C_4$-alkyl terminated polydimethylsiloxane, α-N-methyl-(meth)acryloylamidopropyloxypropyl terminated ω-$C_1$-$C_4$-alkyl terminated polydimethylsiloxane, α-[3-(meth)acrylamidoethoxy-2-hydroxypropyloxy-propyl]-terminated ω-$C_1$-$C_4$-alkyl polydimethylsiloxane, α-[3-(meth)acrylamidopropyloxy-2-hydroxypropyloxypropyl]-terminated ω-$C_1$-$C_4$-alkyl terminated polydimethylsiloxane, α-[3-(meth)acrylamidoisopropyloxy-2-hydroxypropyloxypropyl]-terminated ω-$C_1$-$C_4$-alkyl terminated polydimethylsiloxane, α-[3-(meth) acrylamidobutyloxy-2-hydroxypropyloxypropyl]-terminated ω-$C_1$-$C_4$-alkyl terminated polydimethylsiloxane, α-[3-(meth)acryloylamido-2-hydroxypropyloxypropyl] terminated ω-$C_1$-$C_4$-alkyl polydimethylsiloxane, α-3-[N-methyl-(meth)acryloylamido]-2-hydroxypropyloxypropyl] terminated ω-$C_1$-$C_4$-alkyl terminated polydimethylsiloxane, N-methyl-N'-(propyltetra(dimethylsiloxy)dimethylbutylsilane) (meth)acrylamide, N-(2,3-dihydroxypropane)-N'-(propyltetra(dimethylsiloxy)dimethylbutylsilane) (meth)acrylamide, (meth)acryloylamidopropyltetra(dimethylsiloxy) dimethylbutylsilane, α-vinyl carbonate-terminated ω-$C_1$-$C_4$-alkyl-terminated polydimethylsiloxanes, α-vinyl carbamate-terminated ω—$C_1$-$C_4$-alkyl-terminated polydimethylsiloxane, those disclosed in U.S. Pat. Nos. 9,097,840 and 9,103,965, and mixtures thereof. The above preferred polysiloxanes vinylic monomers of formula (M1) can be obtained from commercial suppliers (e.g., Shin-Etsu, Gelest, etc.) or prepared according to procedures described in patents, e.g., U.S. Pat. Nos. 5,070,215, 6,166,236, 6,867,245, 8,415,405, 8,475,529, 8,614,261, and 9,217,813, or by reacting a hydroxyalkyl (meth)acrylate or (meth)acrylamide or a (meth)acryloxypolyethylene glycol with a mono-epoxypropyloxypropyl-terminated polydimethylsiloxane, by reacting glycidyl (meth)acrylate with a mono-carbinol-terminated polydimethylsiloxane, a mono-aminopropyl-terminated polydimethylsiloxane, or a mono-ethylaminopropyl-terminated polydimethylsiloxane, or by reacting isocyanatoethyl (meth)acrylate with a mono-carbinol-terminated polydimethylsiloxane according to coupling reactions well known to a person skilled in the art.

Examples of preferred siloxane-containing vinylic monomers of formula (M2) include without limitation tris(trimethylsilyloxy)silylpropyl (meth)acrylate, [3-(meth)acryloxy-2-hydroxypropyloxy]propylbis(trimethylsiloxy) methylsilane, [3-(meth)acryloxy-2-hydroxypropyloxy] propylbis(trimethylsiloxy)butylsilane, 3-(meth)acryloxy-2-(2-hydroxyethoxy)-propyloxy)propylbis(trimethylsiloxy) methylsilane, 3-(meth)acryloxy-2-hydroxypropyloxy) propyltris(trimethylsiloxy)silane, N-[tris(trimethylsiloxy)silylpropyl]-(meth)acrylamide, N-(2-hydroxy-3-(3-(bis(trimethylsilyloxy)methylsilyl)propyloxy)propyl)-2-methyl (meth) acrylamide, N-(2-hydroxy-3-(3-(bis(trimethylsilyloxy) methylsilyl)propyloxy)-propyl) (meth)acrylamide, N-(2-hydroxy-3-(3-(tris(trimethylsilyloxy)silyl)propyloxy) propyl)-2-methyl acrylamide, N-(2-hydroxy-3-(3-(tris (trimethylsilyloxy)silyl)propyloxy)propyl) (meth) acrylamide, N-[tris(dimethylpropylsiloxy)silylpropyl]-(meth)acrylamide, N-[tris(dimethylphenylsiloxy) silylpropyl] (meth)acrylamide, N-[tris(dimethylethylsiloxy) silylpropyl](meth)acrylamide, N, N-bis[2-hydroxy-3-(3-(bis (trimethylsilyloxy)methylsilyl)propyloxy)propyl]-2-methyl (meth)acrylamide, N,N-bis[2-hydroxy-3-(3-(bis(trimethylsilyloxy)methylsilyl)-propyloxy)propyl] (meth)acrylamide, N,N-bis[2-hydroxy-3-(3-(tris(trimethylsilyloxy)silyl)-propyloxy)propyl]-2-methyl (meth)acrylamide, N,N-bis[2-hydroxy-3-(3-(tris(trimethylsilyloxy)-silyl) propyloxy)propyl] (meth)acrylamide, N-[2-hydroxy-3-(3-(t-butyldimethylsilyl)propyloxy)-propyl]-2-methyl (meth)acrylamide, N-[2-hydroxy-3-(3-(t-butyldimethylsilyl)propyloxy)propyl] (meth)acrylamide, N, N-bis[2-hydroxy-3-(3-(t-butyldimethylsilyl)propyloxy)propyl]-2-methyl (meth) acrylamide, N-2-(meth)acryloxyethyl-O-(methyl-bis-trimethylsiloxy-3-propyl)silyl carbamate, 3-(trimethylsilyl) propylvinyl carbonate, 3-(vinyloxycarbonylthio)propyl-tris (trimethyl-siloxy)silane, 3-[tris(trimethylsiloxy)silyl] propylvinyl carbamate, 3-[tris(trimethylsiloxy)silyl] propyl allyl carbamate, 3-[tris(trimethylsiloxy)silyl]propyl vinyl carbonate, those disclosed in U.S. Pat. Nos. 9,097,840, 9,103,965 and 9,475,827, and mixtures thereof. The above preferred siloxane-containing vinylic monomers can be obtained from commercial suppliers or can be prepared according to procedures described in U.S. Pat. Nos. 5,070, 215, 6,166,236, 7,214,809, 8,475,529, 8,658,748, 9,097,840, 9,103,965, and 9,475,827.

Any suitable polysiloxane vinylic crosslinkers can be used in the invention. Examples of preferred polysiloxane vinylic crosslinkers are di-(meth)acryloyl-terminated polydimethylsiloxanes; di-vinyl carbonate-terminated polydimethylsiloxanes; di-vinyl carbamate-terminated polydimethylsiloxane; N,N,N',N'-tetrakis(3-methacryloxy-2-hydroxypropyl)-alpha,omega-bis-3-aminopropyl-polydimethylsiloxane; polysiloxane-containing macromer selected from the group consisting of Macromer A, Macromer B, Macromer C, and Macromer D described in U.S. Pat. No. 5,760,100; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, 6,762,264, 4,259,467, 4,260,725, and 4,261,875.

One class of preferred polysiloxane vinylic crosslinkers are di-(meth)acryloyloxy-terminated polysiloxane vinylic crosslinkers each having dimethylsiloxane units and hydrophilized siloxane units each having one methyl substituent and one monovalent $C_4$-$C_{40}$ organic radical substituent having 2 to 6 hydroxyl groups as disclosed in U.S. Pat. App. Pub. No. 2017-0166673 A1, more preferably a polysiloxane vinylic crosslinker of formula (I)

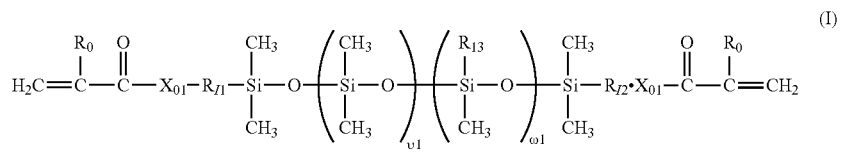

(I)

in which:

$v1$ is an integer of from 30 to 500 and $\omega1$ is an integer of from 1 to 75, provided that $\omega1/v1$ is from about 0.035 to about 0.15 (preferably from about 0.040 to about 0.12, even more preferably from about 0.045 to about 0.10);

$X_{01}$ is O or $NR_N$ in which $R_N$ is hydrogen or $C_1$-$C_{10}$-alkyl;

$R_0$ is hydrogen or methyl;

$R_{I1}$ and $R_{I2}$ independently of each other are a substituted or unsubstituted $C_1$-$C_{10}$ alkylene divalent radical or a divalent radical of —$R_{I4}$—O—$R_{I5}$— in which $R_{I4}$ and $R_{I5}$ independently of each other are a substituted or unsubstituted $C_1$-$C_{10}$ alkylene divalent radical;

$R_{I3}$ is a monovalent radical of any one of formula (Ia) to (Ie)

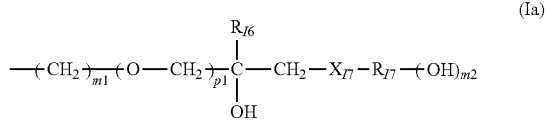

(Ia)

(Ib)

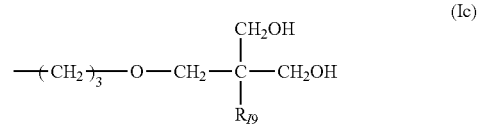

(Ic)

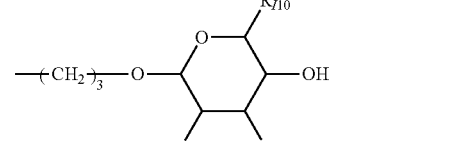

(Id)

(Ie)

p1 is zero or 1; m1 is an integer of 2 to 4; m2 is an integer of 1 to 5; m3 is an integer of 3 to 6; m4 is an integer of 2 to 5;

$R_{I6}$ is hydrogen or methyl;

$R_{I7}$ is a $C_2$-$C_6$ hydrocarbon radical having (m2+1) valencies;

$R_{I8}$ is a $C_2$-$C_6$ hydrocarbon radical having (m4+1) valencies;

$R_{I9}$ is ethyl or hydroxymethyl;

$R_{I10}$ is methyl or hydroxymethyl;

$R_{I11}$ is hydroxyl or methoxy;

$X_{I1}$ is a sulfur linkage of —S— or a teriary amino linkage of —$NR_{I12}$— in which $R_{I12}$ is $C_1$-$C_1$ alkyl, hydroxyethyl, hydroxypropyl, or 2,3-dihydroxypropyl; and $X_{I2}$ is an amide linkage of

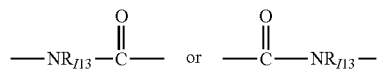

in which $R_{I13}$ is hydrogen or $C_1$-$C_{10}$ alkyl.

In a particularly preferred embodiment, the monovalent radical $R_{I3}$ is a radical of formula (Ie) in which m1 is 3, p1 is 1, and $R_{I6}$ is hydrogen. Such a preferred polysiloxane vinylic crosslinker is represented by formula (A)

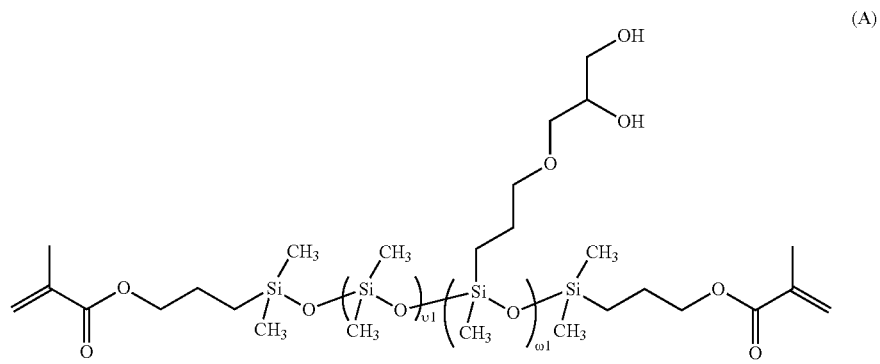

in which v1 and ω1 are as defined above.

A polysiloxane vinylic crosslinker of formula (I) can be prepared according to procedures described in U.S. Pat. Appl. Pub. No. 2017-0166673 A1.

Other classes of preferred polysiloxane vinylic crosslinkers are vinylic crosslinkers of any one of formula (1) to (7)

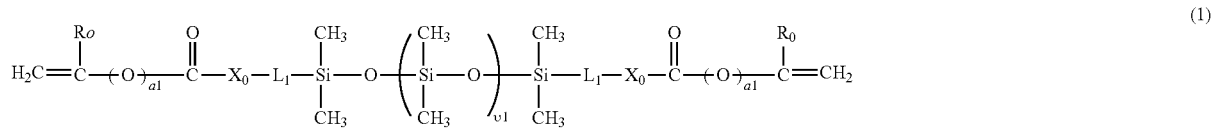

(1)

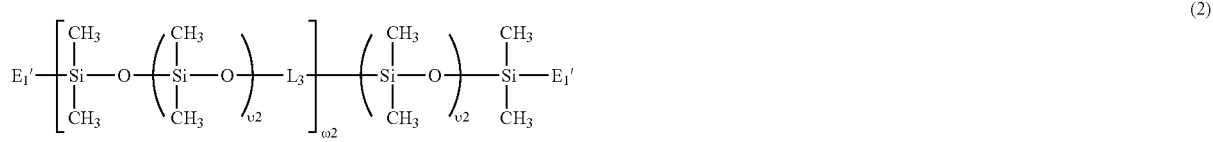

(2), (3)

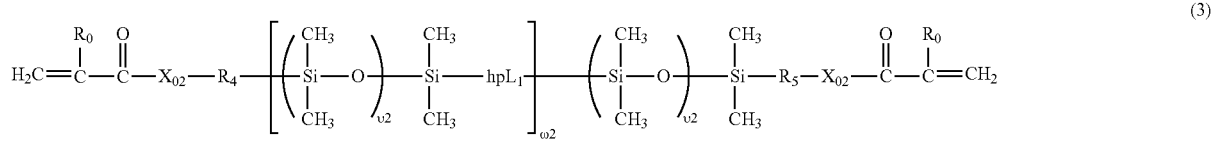

(4), (5)

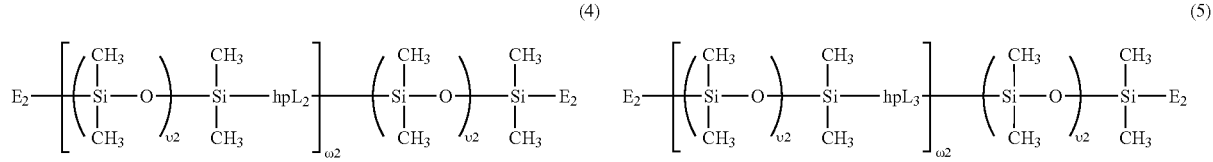

(6)

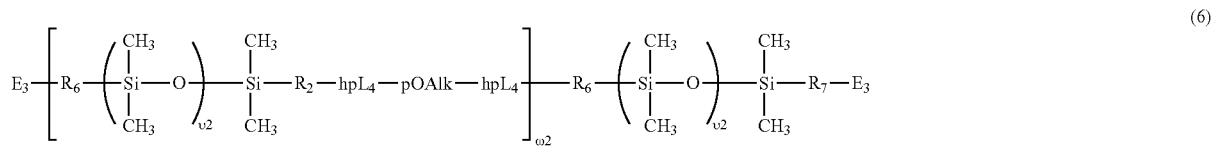

-continued (7)

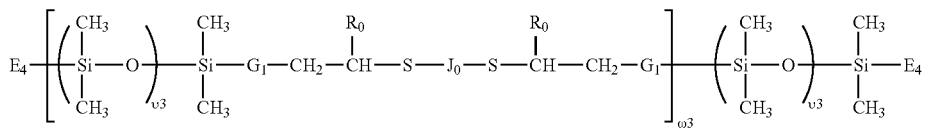

in which:
v1 is an integer of from 30 to 500;
v2 is an integer of from 5 to 50;
v3 is an integer of from 5 to 100;
ω2 and ω3 independent of each other are an integer of from 1 to 15;
a1 and g1 independent of each other is zero or 1;
h1 is an integer of 1 to 20 and h2 is an integer of 0 to 20;
m1 and m3 independent of each other is 0 or 1, m2 is an integer of 1 to 6, m4 is an integer of 1 to 5, m5 is 2 or 3;
q1 is an integer of 1 to 20, q2 is an integer of 0 to 20, q3 is an integer of 0 to 2, q4 is an integer of 2 to 50, q5 and q6 independent of each other are a number of 0 to 35, provided that (q4+q5+q6) is an integer of 2 to 50;
x+y is an integer of from 10 to 30;
e1 is an integer of 5 to 100, p1 and b1 independent of each other are an integer of 0 to 50, provided that (e1+p1+b1)≥10 and e1/(p1+b1)≥2 (preferably from about 2:1 to about 10:1, more preferably from about 3:1 to about 6:1) when (p1+b1)≥1;
$R_0$ is H or methyl;
$R_1$, $R_{1n}$, $R_{2n}$, $R_{3n}$, and $R_{4n}$ independent of one another are H or a $C_1$-$C_4$ alkyl having 0 to 2 hydroxyl group;
$R_{n5}$ is H or a $C_1$-$C_{10}$ alkyl;
$R_2$ is a $C_4$-$C_{14}$ hydrocarbon divalent radical;
$R_3$ is a $C_2$-$C_6$ alkylene divalent radical;
$R_4$ and $R_5$ independent of each other are a $C_1$-$C_6$ alkylene divalent radical or a $C_1$-$C_6$ alkylene-oxy-$C_1$-$C_6$ alkylene divalent radical;
$R_6$ and $R_7$ independent of each other are a $C_1$-$C_6$ alkylene divalent radical or a $C_1$-$C_6$ alkoxy-$C_1$-$C_6$ alkylene divalent radical;
$R_8$ and $R_9$ independent of each other are a substituted or unsubstituted $C_1$-$C_{12}$ alkylene divalent radical;
$X_o$, $X_1'$, $X_{o1}$, $X_{o2}$, and $X_{o3}$ independent of one another are O or $NR_1$;
$X_1$ is O, $NR_1$, NHCOO, OCONH, $CONR_1$, or $NR_1CO$;
$X_{o4}$ is —COO— or —$CONR_{n5}$—;
$X_{o5}$ and $X_{o7}$ independent of each other are a direct bond, —COO— or —$CONR_{n5}$—;
$X_{o6}$ is a direct bond, a $C_1$-$C_6$ alkylene divalent radical, a $C_1$-$C_6$ alkylenoxy divalent radical, —COO—, or —$CONR_{n5}$—;

$X_{o8}$ is a direct bond or —COO—;
$X_{o9}$ is O or $NR_{n5}$;
$X_{10}$ is a direct bond, a $C_1$-$C_6$ alkylene divalent radical, —COO—, or —$CONR_{n5}$—;
$E_1'$ is a monovalent radical of

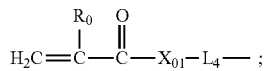

$E_2$ is a monovalent radical of

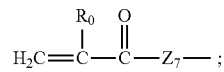

$E_3$ is a monovalent radical of

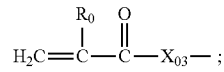

$E_4$ is a monovalent radical of

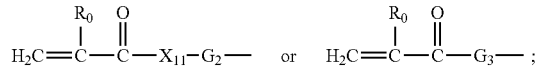

$L_1$ is a $C_2$-$C_8$ alkylene divalent radical or a divalent radical of -$L_1'$-$X_1$-$L_1''$-, —(C$_2$H$_4$O)$_{q1}$—L$_1''$—,   —(C$_2$H$_4$O)$_{q1}$—CONH—L$_1''$—, —L$_1'$—NHCOO—(C$_2$H$_4$O)$_{q1}$—L$_1''$—, —CH$_2$—CH(OH)—CH$_2$—X$_1'$—(C$_2$H$_4$O)$_{q2}$—L$_1''$—, —L$_1'$—X$_1'$—CH$_2$—CH(OH)—CH$_2$—O—L$_1''$—, or —(C$_2$H$_4$O)$_{q1}$—CH$_2$—CH(OH)—CH$_2$—O—L$_1''$—;

$L_1'$ is a $C_2$-$C_8$ alkylene divalent radical which has zero or one hydroxyl group;
$L_1''$ is $C_3$-$C_8$ alkylene divalent radical which has zero or one hydroxyl group;
$L_3$ is a divalent radical of —L$_3'$—O—(C$_2$H$_4$O)$_{q2}$—CONH—R$_2$—(NHCO—PE—CONH—R$_2$)$_{g1}$—NHCO—(OC$_2$H$_4$)$_{q2}$—O—L$_3'$— in which PE is a divalent radical of or

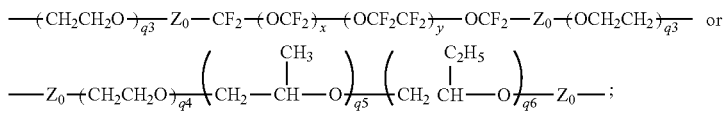

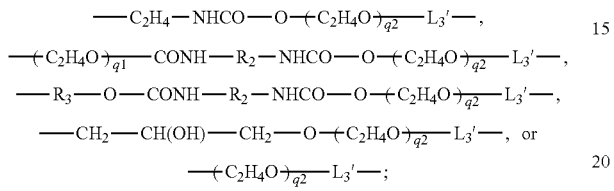

$L_3'$ is $C_3$-$C_8$ alkylene divalent radical;
$L_4$ is a divalent radical of

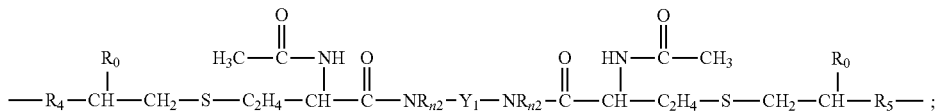

$hpL_1$ is a divalent radical of

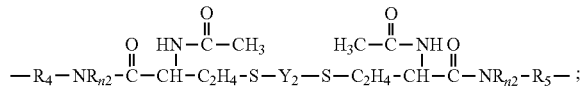

$hpL_2$ is a divalent radical of

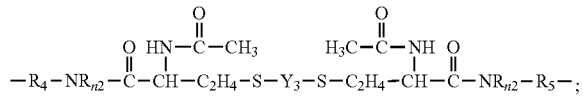

$hpL_3$ is a divalent radical of

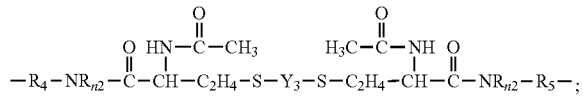

$hpL_4$ is a divalent radical of

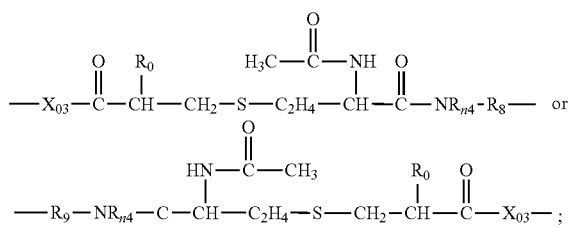

pOAlk is a divalent radical of

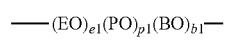

in which EO is an oxyethylene unit ($-CH_2CH_2-$), PO is an oxypropylene unit

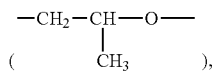

and BO is an oxybutylene unit

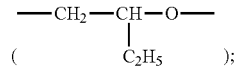

$M_0$ is $C_3$-$C_8$ alkylene divalent radical;
$M_1$ is a $C_4$-$C_{14}$ hydrocarbon divalent radical;
$M_2$ and $M_3$ independent of each other are a $C_1$-$C_6$ alkylene divalent radical;
$J_0$ is a $C_1$-$C_{12}$ hydrocarbon radical having 0 to 2 hydroxyl or carboxyl groups;
G1 is a direct bond, a $C_1$-$C_4$ alkylene divalent radical, or a bivalent radical of

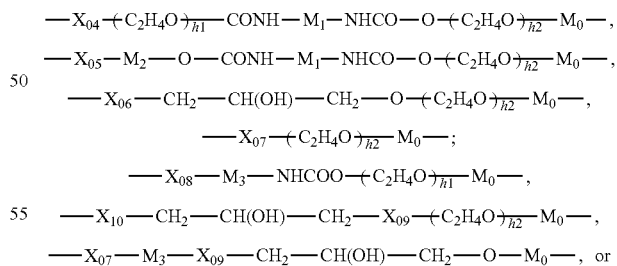

in which $M_0$ is linked to Si atom while $X_{04}$ to $X_{10}$ are linked to the group of $-CH_2-$ in formula (7) and at least one of $J^0$ and G1 in formula (7) comprises at least one moieties selected from the group consisting of hydroxyl groups, urethane linkage of $-OCONH-$, amino groups of $-NHR^0$, amino linkages of $-NH-$, amide linkages of $-CONH-$, carboxyl groups, and combinations thereof;

$G_2$ is a $C_1$-$C_4$ alkylene divalent radical or a bivalent radical of

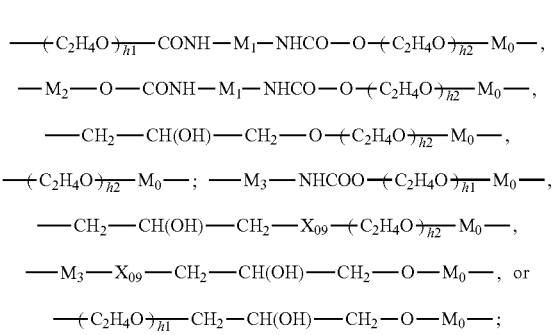

$G_3$ is a divalent radical of

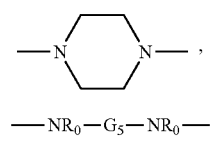

in which h3 and h4 independent of each other are 1 or 0;

G4 is a divalent radical of any one of (a) —NR$_3$'— in which R$_3$' is hydrogen or $C_1$-$C_3$ alkyl, (b)

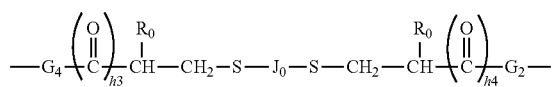

(c)

—NR$_0$—G$_5$—NR$_0$— in which $G_5$ is a $C_1$-$C_6$ alkylene divalent radical, 2-hydroxylpropylene divalent radical, 2-(phosphonyloxy)propylene divalent radical, 1,2-dihydroxyethylene divalent radical, 2,3-dihydroxybutylene divalent radical, and (d) —O-G$_6$-O— in which $G_6$ is a $C_1$-$C_6$ alkylene divalent radical, a divalent radical of

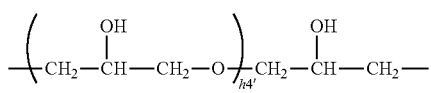

in which h4' is 1 or 2, a divalent radical of

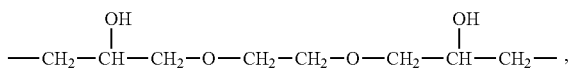

a divalent radical of

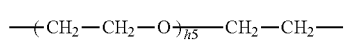

in which h5 is an integer of 1 to 5, a divalent radical of

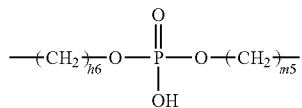

in which h6 is 2 or 3, or a substituted $C_3$-$C_8$ alkylene divalent radical having a hydroxyl group or phosphonyloxy group;

$Y_1$ is a $C_1$-$C_6$ alkylene divalent radical, 2-hydroxylpropylene divalent radical, 2-(phosphonyloxy)propylene divalent radical, 1,2-dihydroxyethylene divalent radical, a divalent radical of

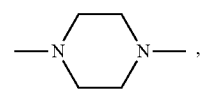

or a divalent radical of

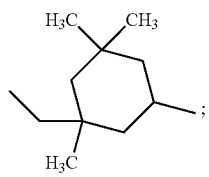

$Y_2$ is a divalent radical of

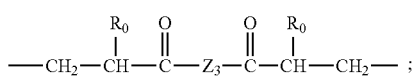

$Y_3$ is a divalent radical of

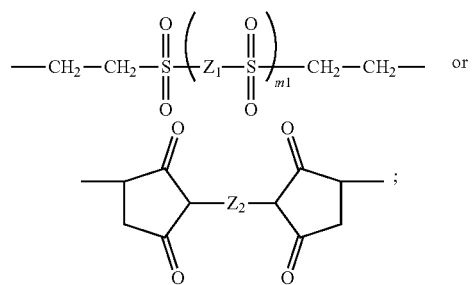

$Z_0$ is a direct bond or a $C_1$-$C_{12}$ alkylene divalent radical;

$Z_1$ is a $C_1$-$C_6$ alkylene divalent radical, a hydroxyl- or methoxy-substituted $C_1$-$C_6$ alkylene divalent radical, or a substituted or unsubstituted phenylene divalent radical, $Z_2$ is a $C_1$-$C_6$ alkylene divalent radical, a hydroxyl- or methoxy-substituted $C_1$-$C_6$ alkylene divalent radical, a dihydroxyl- or dimethoxy-substituted $C_2$-$C_6$ alkylene divalent radical, a divalent radical of —$C_2H_4$—(O—$C_2H_4$)$_{m2}$—, a divalent radical of —$Z_4$—S—S—$Z_4$—, a hydroxyl- or methoxy-substituted $C_1$-$C_6$ alkylene divalent radical, or a substituted or unsubstituted phenylene divalent radical, $Z_3$ is a divalent radical of any one of (a) —NR$_{n3}$—, (b)

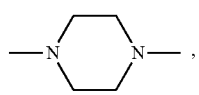

(c) —NR₀—Z₅—NR₀—, and (d) —O—Z₆—O—, $Z_4$ is a $C_1$-$C_6$ alkylene divalent radical, $Z_5$ is a $C_1$-$C_6$ alkylene divalent radical, 2-hydroxylpropylene divalent radical, 2-(phosphonyloxy)propylene divalent radical, 1,2-dihydroxyethylene divalent radical, 2,3-dihydroxybutylene divalent radical, $Z_6$ is (a) a $C_1$-$C_6$ alkylene divalent radical, (b) a divalent radical of

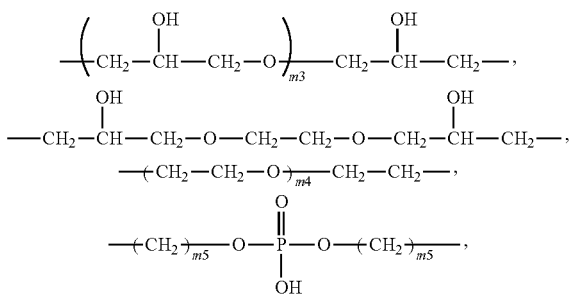

or (c) a substituted $C_3$-$C_8$ alkylene divalent radical having a hydroxyl group or phosphonyloxy group, $Z_7$ is a divalent radical of

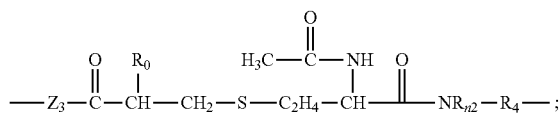

and $Z_8$ is a divalent radical of

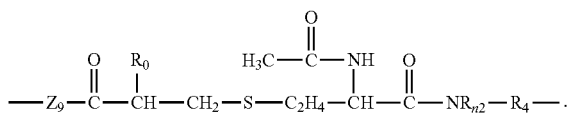

Polysiloxane vinylic crosslinkers of formula (1) can be obtained from commercial suppliers, or prepared by reacting glycidyl (meth)acrylate (meth)acryloyl chloride with a di-amino-terminated polydimethylsiloxane or a di-hydroxyl-terminated polydimethylsiloxane, reacting isocyantoethyl (meth)acrylate with di-hydroxyl-terminated polydimethylsiloxanes, reacting an amino-containing acrylic monomer with di-carboxyl-terminated polydimethylsiloxane in the presence of a coupling agent (a carbodiimide); reacting a carboxyl-containing acrylic monomer with di-amino-terminated polydimethylsiloxane in the presence of a coupling agent (a carbodiimide). Or reacting a hydroxyl-containing acrylic monomer with a di-hydroxy-terminated polydisiloxane.

Preferred examples of polysiloxane vinylic crosslinkers of formula (1) include without limitation α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane, combinations thereof.

Chain-extended polysiloxane vinylic crosslinkers of formula (2) can be prepared according to the procedures described in U.S. Pat. Nos. 5,034,461, 5,416,132, 5,449,729, 5,760,100, 7,423,074, and 8,529,057. Chain-extended polysiloxane vinylic crosslinkers of formula (3), (4) or (5) can be prepared according to the procedures described in detail in U.S. Pat. App. Pub. No. 2018-0100053 A1. Chain-extended polysiloxane vinylic crosslinkers of formula (6) can be prepared according to the procedures described in detail in U.S. Pat. App. Pub. No. 2018-0100038 A1. Chain-extended polysiloxane vinylic crosslinkers of formula (6) can be prepared according to the procedures described in U.S. Pat. No. 8,993,651.

Another class of preferred chain-extended polysiloxane vinylic crosslinkers are those which each comprise at least two polysiloxane segments and dangling hydrophilic polymer chains each covalently attached to a divalent radical separating each pair of adjacent polysiloxane segments and having at least two pendant hydrophilic groups and/or chains as disclosed in U.S. Pat. Appl. Pub. No. 2012-0088843 A1; those which each comprise at least two polysiloxane segments and dangling hydrophilic polymer chains each covalently attached to a divalent radical separating each pair of adjacent polysiloxane segments as disclosed in U.S. Pat. Appl. Pub. No. 2012-0088844 A1.

Examples of preferred hydrophilic (meth)acrylamido monomers include without limitation (meth)acrylamide, N-methyl (meth)acrylamide, N,N-dimethyl (meth)acrylamide, N-ethyl (meth)acrylamide, N,N-diethyl (meth)acrylamide, N-propyl (meth)acrylamide, N-isopropylacrylamide, N-3-methoxypropyl (meth)acrylamide, N-tert-butylacrylamide, N-2-hydroxyethyl (meth)acrylamide, N,N-bis(2-hydroxyethyl) (meth)acrylamide, N-2-hydroxypropyl (meth) acrylamide, N-3-hydroxypropyl (meth)acrylamide, N-2,3-dihydroxypropyl (meth)acrylamide, N-[tris(hydroxymethyl) methyl]-acrylamide, N-2-aminoethyl (meth)acrylamide, N-2-methylaminoethyl (meth)acrylamide, N-2-ethylaminoethyl (meth)acrylamide, N-2-dimethylaminoethyl (meth) acrylamide, N-3-aminopropyl (meth)acrylamide, N-3-methylaminopropyl (meth)acrylamide, N-3-dimethylaminopropyl acrylamide, 2-(meth)acrylamidoglycolic acid, and combinations thereof. It is believed that such hydrophilic (meth)acrylamido monomers can be used in increasing the glass transition temperature of a resultant silicone hydrogel material.

Examples of preferred organic solvents having 2 to 8 carbon atoms include without limitation, alcohols having 2 to 8 carbon atoms (e.g., ethanol, 1-propanol, isopropanol, 1-butanol, sec-butanol, isobutanol, tert-butyl alcohol, 1-pentanol, 2-pentanol, 3-pentanol, 3-methyl-2-butanol, 2-methyl-1-butanol, 2,2-dimethyl-1-propanol, tert-amyl alcohol, 2-hexanol, 3-hexanol, 2-heptanol, 2-octanol, 2-nonanol, 2-decanol, 3-octanol, 2-methyl-2-pentanol, 2,3-dimethyl-2-butanol, 3-methyl-3-pentanol, 2-methyl-2-hexanol, 3-methyl-3-hexanol, 3-methyl-3-heptanol, 4-methyl-4-heptanol, 2-methyl-2-heptanol, 3-ethyl-3-hexanol, 3-methyl-3-heptanol, 2,4-dimethyl-2-pentanol, 3-ethyl-3-pentanol, 1-methoxy-2-propanol, 3-ethoxy-1-propanol, 1-ethoxy-2-propanol, 1-isobutoxy-2-propanol, 3-methoxy-1-butanol, 1-methoxy-2-butanol, norborneol, 1-methylcyclohexanol, 1-methylcyclopentanol, 1-ethylcyclopentanol, 1-ethylcyclopentanol, 4-hydroxy-4-methyl-1-cyclopentanol, or combinations thereof), dipropylene glycol methyl ether, ethylene glycol n-butyl ether, acetone, methyl ethyl ketone, diethylene glycol n-butyl ether, diethylene glycol methyl ether, propylene glycol methyl ether, propylene glycol methyl ether acetate, propylene glycol n-propyl ether, propylene glycol n-butyl ether, ethyl acetate, butyl acetate, amyl acetate, methyl lactate, ethyl lactate, propyl lactate, 1-methyl-2-pyrrolidone, N,N-dimethylpropionamide, dimethyl formamide, dimethyl acetamide, dimethyl propionamide, N-methyl pyrrolidinone, and mixtures thereof. Preferably, the organic solvent is an alcohol having 3 to 5 carbon atoms (e.g., 1-propanol, isopropanol, 1-butanol, sec-butanol, isobutanol, tert-butyl alcohol, 1-pentanol, 2-pentanol, 3-pentanol, 3-methyl-2-butanol, 2-methyl-1-butanol, 2,2-dimethyl-1-propanol, tert-amyl alcohol, 1-methoxy-2-propanol, 3-ethoxy-1-propanol, 1-ethoxy-2-propanol, or combinations thereof).

In a preferred embodiment, an organic solvent having 2 to 6 carbon atoms and a boiling point of lower than 105° C. is be used in the invention. Examples of preferred organic solvents include without limitation, alcohols having 2 to 5 carbon atoms (e.g., ethanol, 1-propanol, isopropanol, sec-butanol, tert-butyl alcohol, tert-amyl alcohol, acetone, methyl ethyl ketone, ethyl acetate, and mixtures thereof. Preferably, the organic solvent is an alcohol having 2 to 5 carbon atoms (e.g., ethanol, 1-propanol, isopropanol, sec-butanol, tert-butyl alcohol, tert-amyl alcohol, or combinations thereof). With a boiling point below 105° C., such an organic solvent could be evaporated to some extend at the post-curing heating step at a post-curing temperature higher than 105° C.

In accordance with the present invention, any radical scavenger can be used as long as it can be dissolved in a fluid composition to be used. Examples of radical scavengers include, but are not limited to, N-oxyl or nitroxide compounds, quinone methides, nitroso compounds, phenothiazine, phenols, and naturally-occurring antioxidant free-radical scavengers. Examples of naturally-occurring antioxidant free-radical scavengers include without limitation vitamin C (ascorbic acid), Vitamin E and citric acid. Preferably, the radical scavenger is TEMPO (4-hydroxy-2,2,6,6,-tetramethyl-1-piperidinyloxy, free radical) (CAS #2226-96-2).

In accordance with the invention, a polymerizable composition of the invention can further comprise about 10% (preferably about 8%, more preferably about 6%, even more preferably about 4%) by weight or less of one or more polymerizable components selected from the group consisting of an N-vinyl amide monomer, a hydrophilic (meth) acryloxy monomer, a hydrophobic acrylic monomer capable of forming a homopolymer with a $T_g$ of at least about 60° C. (preferably at least about 70° C., more preferably at least about 80° C., even more preferably at least about 90° C.), a non-silicone vinylic crosslinker, and combinations thereof, relative to the total weight of the polymerizable composition.

Any suitable N-vinyl amide monomers can be used in the invention. Examples of preferred N-vinyl amide monomers include without limitation N-vinylpyrrolidone, N-vinyl piperidone, N-vinyl caprolactam, N-vinyl-N-methyl acetamide, N-vinyl formamide, N-vinyl acetamide, N-vinyl isopropylamide, N-vinyl-N-methyl acetamide, N-vinyl-N-ethyl acetamide, N-vinyl-N-ethyl formamide, and mixtures thereof. Preferably, the N-vinyl amide monomer is N-vinylpyrrolidone, N-vinyl-N-methyl acetamide, or combinations thereof.

Examples of preferred hydrophilic (meth)acryloxy monomers includes without limitation 2-hydroxyethyl (meth) acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a weight average molecular weight of up to 1500, (meth)acrylic acid, ethylacrylic acid, 2-aminoethyl (meth)acrylate, 2-methylaminoethyl (meth) acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth) acrylate, and combinations thereof.

Any hydrophobic acrylic monomer can be used in the invention as a reactive diluent for solubilizing other polymerizable components in a polymerizable composition of the invention, provided that it can form a homopolymer with a $T_g$ of at least about 60° C. It is believed that such a hydrophobic acrylic monomer can increase a $T_g$ of the dominant phase of a resultant silicone hydrogel material above the room temperature and may make the unprocessed silicone hydrogel contact lens more rigid for handling.

Examples of such hydrophobic acrylic monomers includes methyl methacrylate ($T_g$=105° C. of homopolymer), ethyl methacrylate ($T_g$=65° C. of homopolymer), isopropyl methacrylate ($T_g$=81° C. of homopolymer), sec-butyl methacrylate ($T_g$=60° C. of homopolymer), tert-butyl methacrylate ($T_g$=107° C. of homopolymer), cyclohexyl methacrylate ($T_g$=83° C. of homopolymer), isobornyl acrylate ($T_g$=94° C. of homopolymer), isobornyl methacrylate ($T_g$=110° C. of homopolymer), phenyl methacrylate ($T_g$=110° C. of homopolymer), 4-tert-butylstyrene ($T_g$=132° C. of homopolymer), 2-methylstyrene ($T_g$=120° C. of homopolymer), styrene ($T_g$=100° C. of homopolymer), 4-ethoxystyrene ($T_g$=86° C. of homopolymer), 2,4-dimethystyrene ($T_g$=112° C. of homopolymer), 2,5-dimethylstyrene ($T_g$=143° C. of homopolymer), 3,5-dimethylstyrene ($T_g$=104° C. of homopolymer), and combinations thereof. More preferably, methyl methacrylate, tert-butyl methacrylate, cyclohexyl methacrylate, isobornyl acrylate, isobornyl methacrylate, or a combination thereof is used in the invention. Even more preferably, methyl methacrylate, tert-butyl methacrylate, cyclohexyl methacrylate, or a combination thereof is used in the invention.

Examples of preferred non-silicone vinylic cross-linking agents include without limitation ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, and 3,4-bis[(meth)acryloyl]tetrahydrofuan, diacrylamide (i.e., N-(1-oxo-2-propenyl)-2-propenamide), dimethacrylamide (i.e., N-(1-oxo-2-methyl-2-propenyl)-2-methyl-2-propenamide), N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamide-propane-2-yl dihydrogen phosphate (i.e., N,N'-2-phophonyloxypropylene bis(meth)acrylamide), piperazine diacrylamide (or 1,4-bis(meth)acryloyl piperazine), tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, and combinations thereof. A preferred non-silicone vinylic cross-linking agent is tetra(ethyleneglycol) di-(meth)acrylate, tri(ethyleneglycol) di-(meth)acrylate, ethyleneglycol di-(meth)acrylate, di(ethyleneglycol) di-(meth)acrylate, tetraethyleneglycol divinyl ether, triethyleneglycol divinyl ether, diethyleneglycol divinyl ether, ethyleneglycol divinyl ether, triallyl isocyanurate, triallyl cyanurate, or a combination thereof. In accordance with the invention, the amount of a non-silicone vinylic crosslinker in a polymerizable composition of the invention is about 1.5% or less (preferably about 1.2% or less, more preferably from about 0.1% to about 1.0%) by weight relative to the total weight of all polymerizable components in the polymerizable composition.

Any suitable thermal polymerization initiators, known to the skilled artisan, can be used in the invention. Examples of thermal polymerization initiators includes without limitation peroxides, hydroperoxides, azo-bis(alkyl- or cycloalkylnitriles), persulfates, percarbonates or mixtures thereof. Examples of thermal free radical initiators are benzoylperoxide, tert.-butyl peroxide, di-tert.-butyl-diperoxyphthalate, tert.-butyl hydroperoxide, azo-bis(isobutyronitrile) (AIBN), 1,1-azodiisobutyramidine, 1,1'-azo-bis (1-cyclohexanecarbonitrile), 2,2'-azo-bis(2,4-dimethylvaleronitrile) and the like. The polymerization is carried out conveniently in an above-mentioned solvent at elevated temperature, for example at a temperature of from 25 to 100° C. and preferably 40 to 80° C. The reaction time may vary within wide limits, but is conveniently, for example, from 1 to 24 hours or preferably from 2 to 12 hours. It is advantageous to previously degas the components and solvents used in the polymerization reaction and to carry out said copolymerization reaction under an inert atmosphere, e.g., under $N_2$ or Ar atmosphere.

In accordance with a preferred embodiment of the invention, a polymerizable composition of the invention can further comprise (but preferably comprises) one or more UV-absorbing vinylic monomers and optionally (but preferably) one or more UV/HEVL-absorbing vinylic monomers. The term "UV/HEVL-absorbing vinylic monomer" refers to a vinylic monomer that can absorb UV light and high-energy-violet-light (i.e., light having wavelength between 380 nm and 440 nm. Examples of UV-absorbing vinylic monomers and UV/HEVL-absorbing vinylic monomers are known to a person skilled in the art and are disclosed in the patents and patent application publications, e.g., U.S. Pat. No. 9,315,669, US 2018-0081197 A1, etc.

A polymerizable composition of the invention can also comprise other necessary components known to a person skilled in the art, such as, for example, a visibility tinting agent (e.g., one or more polymerizable dyes, pigments, or mixtures thereof), antimicrobial agents (e.g., preferably silver nanoparticles), a bioactive agent, leachable lubricants, leachable tear-stabilizing agents, mold releasing agent, and mixtures thereof, as known to a person skilled in the art.

A polymerizable composition of the invention can be prepared by blending all of the desirable components according to any known techniques.

Methods of manufacturing mold sections for cast molding a contact lens are generally well known to those of ordinary skill in the art. The process of the present invention is not limited to any particular method of forming a mold. In fact, any method of forming a mold can be used in the present invention. However, for illustrative purposes, the following discussion has been provided as one embodiment of forming a mold.

In general, a mold comprises at least two mold halves (or mold sections), one male half and one female mold half. The male mold half has a first molding (or optical) surface which is in direct contact with a polymerizable composition for cast molding of a contact lens and defines the posterior (concave) surface of a molded contact lens; and the female mold half has a second molding (or optical) surface which is in direct contact with the polymerizable composition and defines the anterior (convex) surface of the molded contact lens. The male and female mold halves are configured to receive each other such that a lens-forming cavity is formed between the first molding surface and the second molding surface.

FIG. 1 schematically illustrates a preferred mold 100 used in the methods of the invention. The mold 100 comprises a female mold half 1 and male mold half 2.

The male mold half 2 comprises a base 61, a substantially cylindrical body 25 which extends upward from base 61, a posterior molding surface defining the posterior (concave) surface of a molded contact lens, and an annular shoulder 65 which surrounds the posterior molding surface. The posterior molding surface protrudes outward from the top of body 25. The annular shoulder 65 shown is flat. It is understood that the annular shoulder 65 can have any suitable surface, such as, e.g., a tilted surface.

The female mold half 1 comprises a base 51, a substantially cylindrical body 15 which extends upward from base 51, an anterior molding surface defining the anterior (convex) surface of a molded contact lens, and a collar 4. The anterior molding surface recesses downward from the top of the body 15. Collar 4 (or up-protruding flange) is preferably integral part of the female mold half 1 and protrudes upward from the top of the body 15. A circumferential groove (or recess) 11 is formed on top of the body 15 between the anterior molding surface and functions as an overflow for any excess unpolymerized lens-forming material.

The term "collar" as used herein refers to a peripheral circular part which protrudes upward from the top of body of one of the two mating mold halves. A collar can be attached to or preferably integral part of that mold half and which can encircle the other mold half to provide a tight seal between the two mold halves. It is understood that the collar can be provided on either of the male and female mold halves.

The female mold half 1 and a male mold half 2 are configured to receive each other such that a contact lens forming cavity 12 is formed between the anterior and posterior molding surfaces. The collar 4 encircles the body 25 of the male mold half 2 to provide a tight seal 5 between the female and male mold halves when the mold is closed. Typically, there is no lens material in the seal.

In operation, mold halves 1 and 2 can be first injection molded from a plastic resin in an injection molding apparatus, as well known to a person skilled in the art. A specific amount of a polymerizable lens-forming material is typically dispensed into the female mold half 1 by means of a dispensing device and then the male mold half 2 is put on and the mold 100 is closed (FIG. 1). As the mold 100 closes, any excess unpolymerized lens-forming material is pressed into an overflow 11 provided on the female mold half 1. Subsequently, the polymerizable composition in the closed mold 100 is cured thermally in an oven or actinically with UV/visible irradiation.

The mold halves can be formed through various techniques, such as injection molding. Methods of manufacturing mold halves for cast-molding a contact lens are generally well known to those of ordinary skill in the art. The process of the present invention is not limited to any particular method of forming a mold. In fact, any method of forming a mold can be used in the present invention. The mold halves can be formed through various techniques, such as injection molding or lathing. Examples of suitable processes for forming the mold halves are disclosed in U.S. Pat. Nos. 4,444,711; 4,460,534; 5,843,346; and 5,894,002, which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In accordance with the invention, the polymerizable composition can be introduced (dispensed) into a cavity formed by a mold according to any known methods. A specific amount of a polymerizable lens-forming material is typically dispensed into a female mold half by means of a dispensing device and then a male mold half is put on and the mold is closed. As the mold closes, any excess unpolymerized lens-forming material is pressed into an overflow provided on the female mold half (or alternatively on the male mold half).

The closed mold containing the polymerizable composition subsequently is cured (i.e., polymerized) thermally in an oven to produce a molded unprocessed silicone hydrogel lens precursor. Preferably, the oven with the molds therein is purged with nitrogen by flowing nitrogen gas through the oven. It is understood that the thermal curing step can be carried out at one or more curing temperatures as known to person skilled in the art and illustrated in Examples.

After the polymerizable composition in the molds in the oven is cured to form unprocessed silicone hydrogel contact lenses, the temperature of the oven is increased to a post-curing temperature of about 1050° C. or higher (preferably at least about 110° C., more preferably at least about 1150° C., even more preferably at least about 1200° C.), and the flow rate of nitrogen gas through the oven is increased to a second flow rate which is at least about 1.5 folds (preferably at least about 2.0 folds, more preferably at least about 3.0 folds, even more preferably at least about 4.0 folds) of the first flow rate.

The post-curing treatment step (i.e., step (5)) is carried out by heating the lens mold with the unprocessed silicone hydrogel contact lens therewithin in the oven at the post-curing temperature under nitrogen gas flow through the oven at the second flow rate for at least about 30 minutes (preferably at least about 60 minutes, more preferably at least about 90 minutes, even more preferably at least about 120 minutes).

Figure 2:
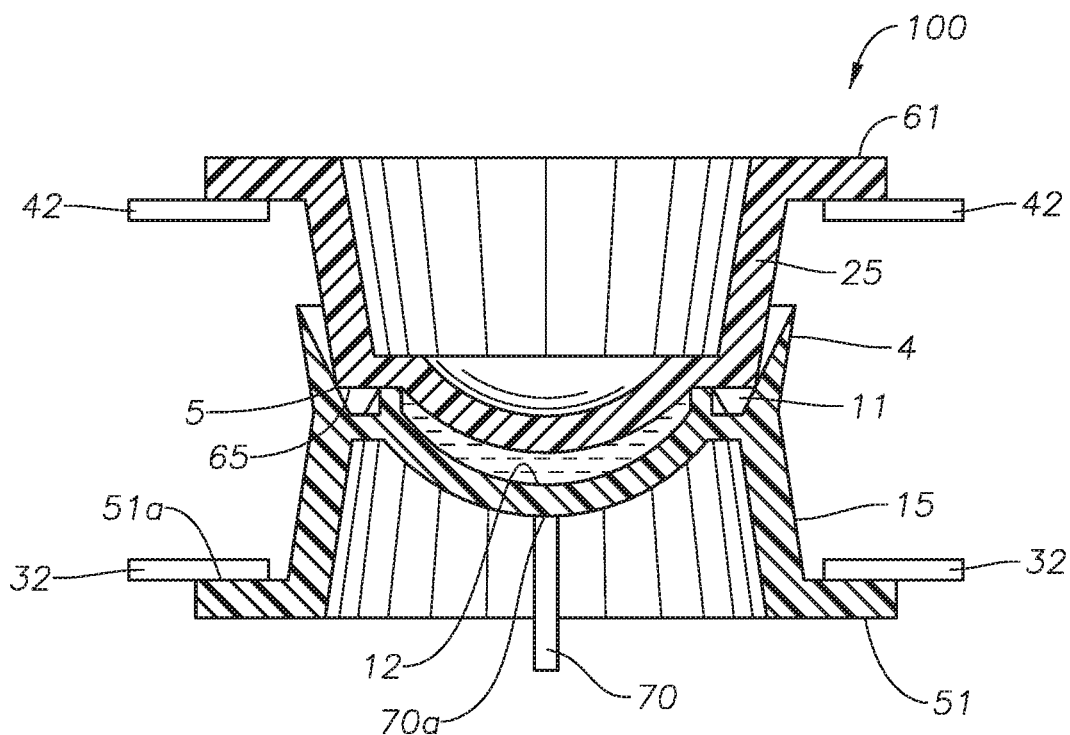
FIG. 2 illustrates schematically a process for separating the male and female mold halves of a lens-forming mold according to the invention and an apparatus for performing a method of the invention.

After the post-curing treatment, the molds are removed from the oven. Subsequently, applying a force to non-optical surface of the female mold at a location about the center area of non-optical molding surface at an angle of less than about 30 degrees, preferably less than about 10 degrees, most preferably less than about 5 degrees (i.e., in a direction substantially normal to center area of non-optical molding surface) relative to the axis of the mold to deform the female mold half which breaks the bonds between the optical molding surface of the female mold half and the molded lens, as shown in FIG. 2. Various ways of applying a force to non-optical surface of the female mold half at a location about the center area of non-optical molding surface along the axis of the mold to deform the female mold half which breaks the bonds between the optical molding surface of the female mold half and the molded lens. It is understood that the mold-opening device can have any configurations known to a person skilled in the art for performing the function of separating two mold halves from each other. For example, referring to FIG. 2, the demolding assembly comprises a pin 70 positionable against the center area of non-optical molding surface of the female mold half. The pin 70 has a flat free end 70a to enable a surface contact between the free end 70a and the center area of non-optical molding surface of the female mold half. It will be appreciated that the scope of the invention is not limited to such a particular flat configuration of the pin end 70a, for example the pin may have a rounded free end. In the present embodiment, the pin 70 is movable and the female mold half remains stationary by applying a restraining force to the female mold half with a first prying finger 32 for maintaining the female mold half in a fixed position. However, it is possible to arrange the assembly so that the female mold half is movable and the pin 70 remains stationary, or so that both the pin 70 and the female mold half can be moved relative to each other.

In use, during the demolding operation, the free end 70a of the pin 70 applies a longitudinally directed force to the central portion of the non-optical surface of the female mold half. The first prying finger 32 applies a counteractive force against the end face 51a of the flange 51 of the female mold half 1. Consequently, the female mold half is compressed between the free end 70a of the pin 70 and the first finger 32. The compression force deforms the curved part of the female mold half and breaks the adhesive bond between the molding surface of the female mold half 1 and the anterior surface of the molded lens 12.

Then, apply a vertical lifting movement to the male mold half with a second prying finger (while maintaining the restraints on the female mold so as to effectuate gradual separation between the female mold and the male mold.

After breaking the bond between the optical molding surface of the female mold half and the molded lens, the mold is separated, the molded unprocessed contact lens adheres to the male mold half 2. It is surprising to find out that, according to the present invention, the molded contact lens adhering to the male mold half even though the molding surfaces of the female mold and male mold are not treated before or after dispensing a specific amount of a polymerizable lens-forming material into one of the mold halves to render the molded contact lens preferentially adhered to the female mold or male mold when separating the mold.

According to the present application as mentioned above, the lens typically remains adhered to the male mold section. However, by using similar principle, the compression can be applied to the applying a force to non-optical surface of the male mold half at a location about the center area of non-optical molding surface along the longitudinal axis of the mold to deform the male mold half to compress the female mold half between the pin and the first set of pry fingers so as to break the bonds between the optical molding surface of the male mold half and the molded lens, thereby the molded lens adheres to the female mold half after separating the mold.

Figure 3:
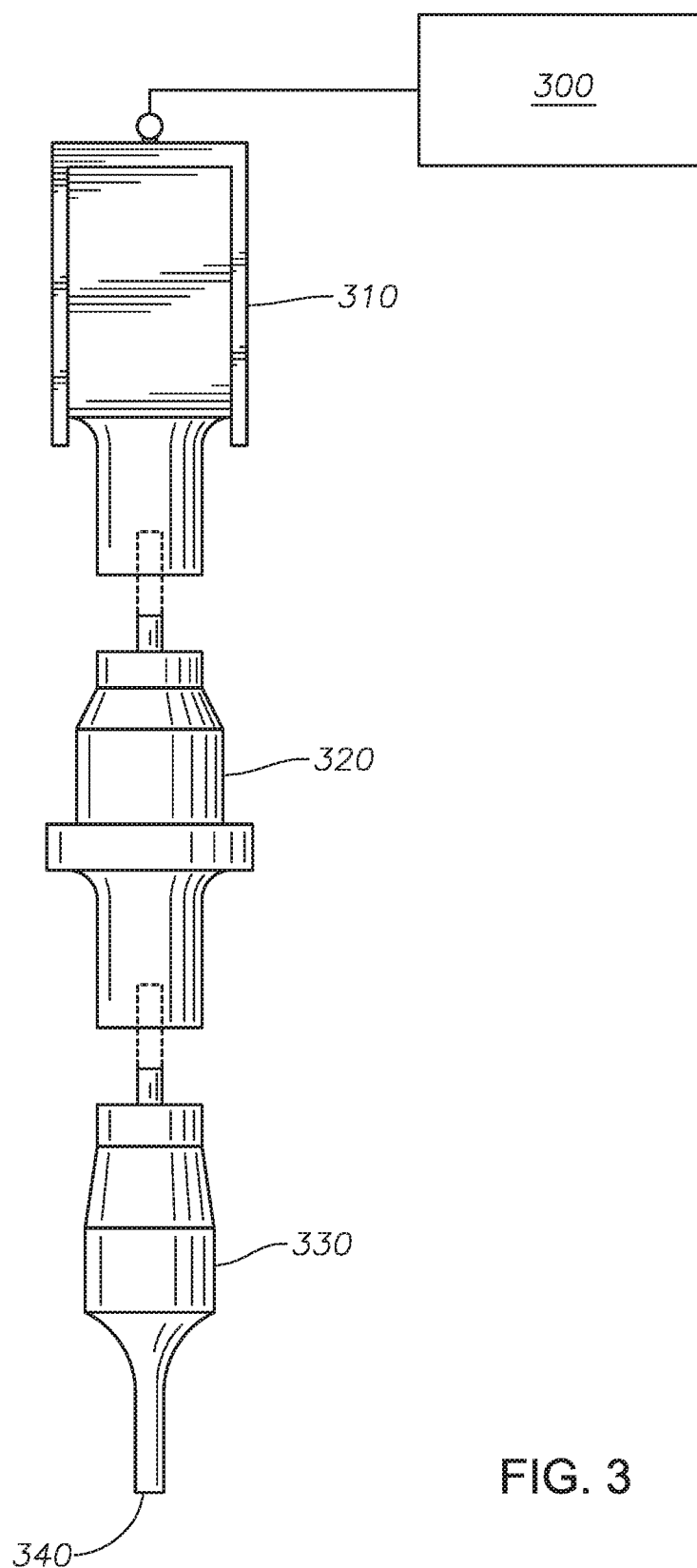
FIG. 3 illustrates an ultrasonic welding system.

According to the present application, an ultrasonic welding system is used not to welding two pieces of plastic material together, but instead to separate molded silicone hydrogel contact lens from the lens-adhered mold half. An ultrasonic welding system as illustrated in FIG. 3 comprises: a power supply 300 which provides a high power AC signal with frequency matching the resonance frequency of the ultrasonic stack. An ultrasonic stack composed of a converter 310, a booster 320 and a horn 330. All three elements of the stack are specifically tuned to resonate at the same exact ultrasonic frequency (Typically 15, 20, 30, 35, 40 or 70 kHz). The converts the electrical signal into a mechanical vibration. The booster modifies the amplitude of the vibration. The horn can also define the amplitude of vibration and apply the mechanical vibration to the parts to be contacted. However, any kind of mechanical system which transfers the vibrational energy from the converter to the mold half can be used.

Figure 4:
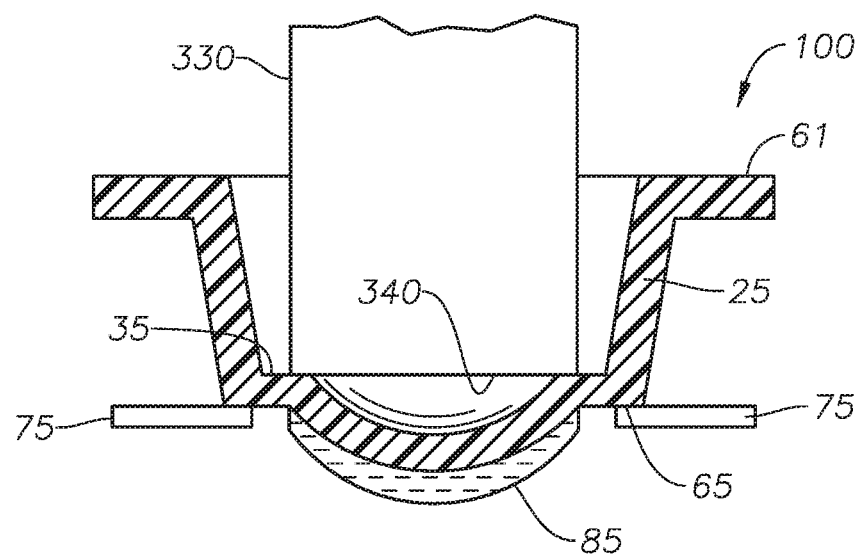
FIG. 4 illustrates a flat ultrasonic horn seated on extended flat edge surround the outer concave surface of the male mold half.

FIG. 4 illustrates an embodiment of the invention wherein an ultrasonic horn 330 having a flat surface 340 is sized to be approximately the outer diameter of the male mold half 2 and seated on extended flat edge surround the outer concave surface 35 (or back surface of the annular shoulder 65 of the male mold half. The male mold half 2 proximate the ultrasonic horn vibrates with the acoustical energy emitted from the ultrasonic horn 330 while the contact lens 85 is attached thereon so that a relative motion at the frequency of the acoustic energy takes place between back surface of the annular shoulder 65 of the male mold half and the contact lens attached thereon. The male mold half and the contact lens attached thereon is held stationary by a position holder 75. A person skilled in the art knows which device can be used as a position holder, for example, a level metal or a cup having an attached level metal. The cup can be used to collect the lens separated from the male mold half. Furthermore, the cup can be attached a vacuum source and the vacuum can assist the separation of the lens from the male mold half.

Figure 5A:
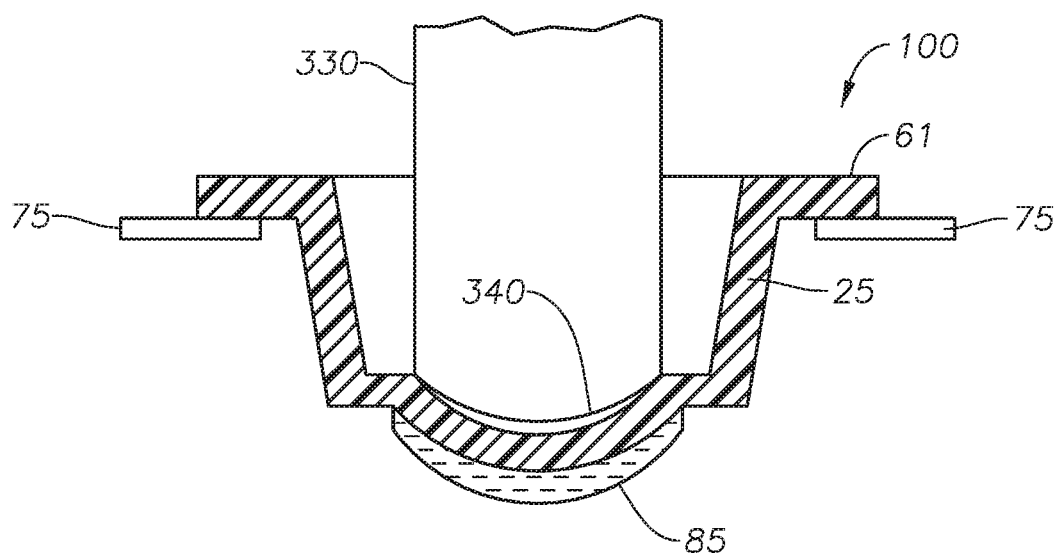
FIGS. 5A and 5B illustrate a convex ultrasonic horn is seated within the outer concave portion of male half mold half.
Figure 5B:
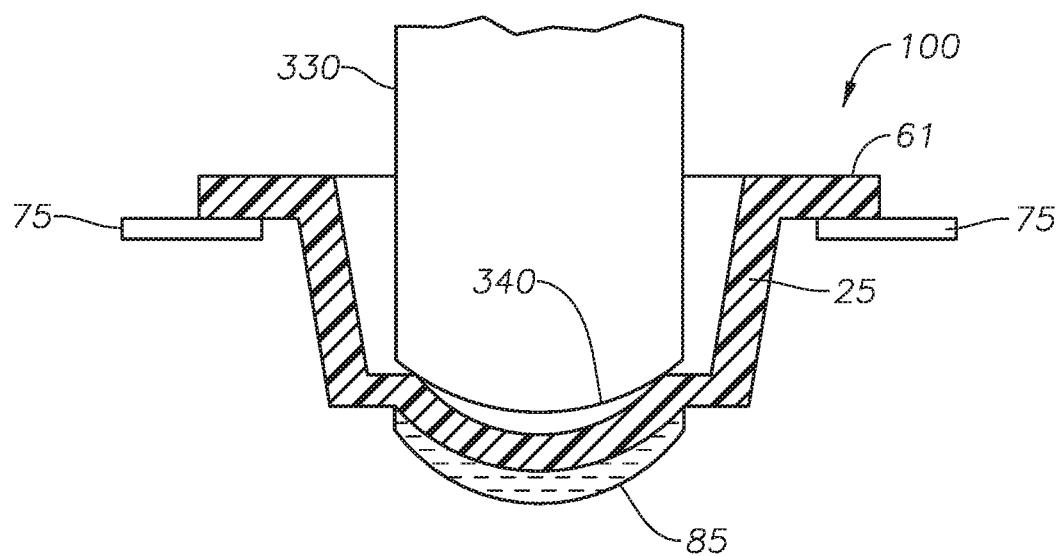

FIGS. 5A and 5B show an embodiment wherein an ultrasonic horn 330 having a convex surface 340 is of a size that allows it to extend within the outer concave portion of male half mold half 2. The male mold half and the contact lens 85 attached thereon is held stationary by a position holder 75. FIG. 5A illustrates that the ultrasonic horn vibrates with the acoustical energy emitted from the ultrasonic horn 330 while the contact lens is attached thereon so that a relative motion at the frequency of the acoustic energy takes place through contact surface between inside of the outer concave portion of male half mold half 2 and the contact lens attached thereon. FIG. 5B illustrates that the ultrasonic horn vibrates with the acoustical energy emitted from the ultrasonic horn 330 while the contact lens is attached thereon so that a relative motion at the frequency of the acoustic energy takes place through contact points between edges of the outer concave portion of male half mold half 2 and the contact lens attached thereon.

Figure 6:
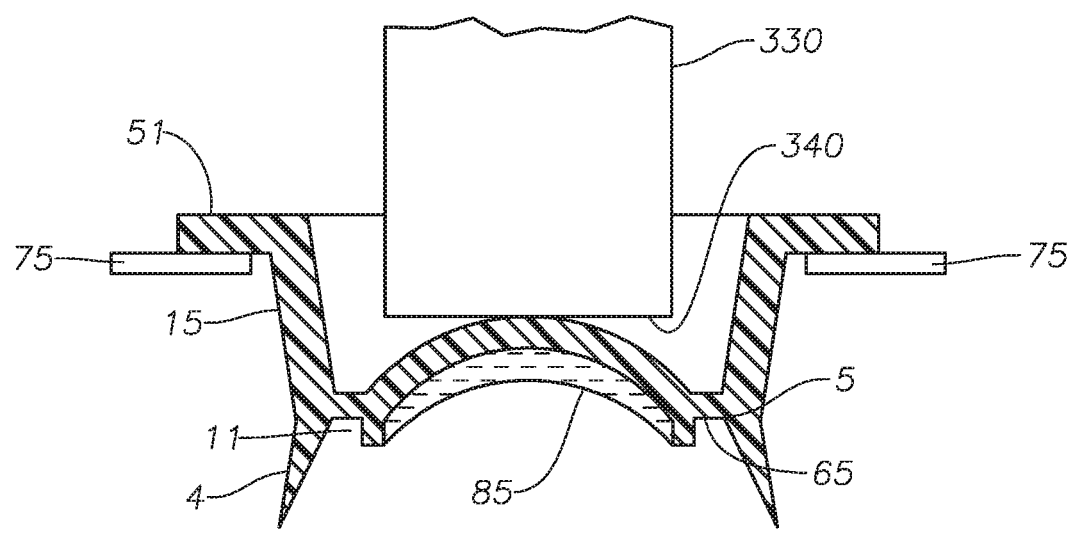
FIG. 6 illustrates a flat ultrasonic horn is sized to be approximately the outer diameter of the female mold half.

FIG. 6 illustrates an embodiment of the invention is shown wherein an ultrasonic horn 330 having a flat surface 340 is sized to be approximately the outer diameter of the female mold half 1 to contact the center area of the outer convex portion of the female mold half. The female mold half and the contact lens 85 attached thereon is held stationary by a position holder 75. The center portion of back surface (non-optical surface) of the female mold half 1 proximate the ultrasonic horn vibrates with the acoustical energy emitted from the ultrasonic horn 330 while the contact lens is attached thereon so that a relative motion at the frequency of the acoustic energy takes place between the female mold half and the contact lens attached thereon.

Figure 7A:
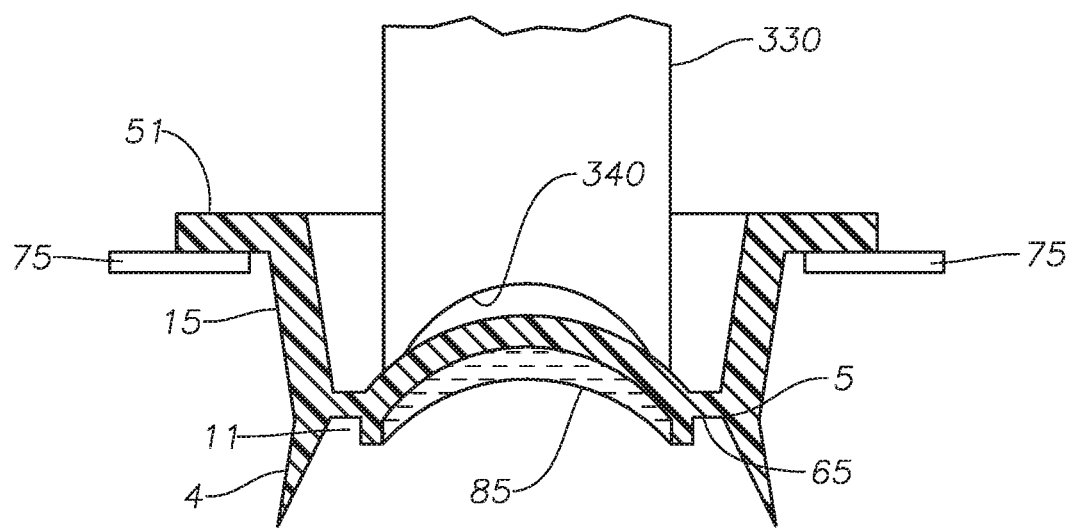
FIGS. 7A and 7B illustrate a concave ultrasonic horn seated within the outer convex portion of female half mold half.
Figure 7B:
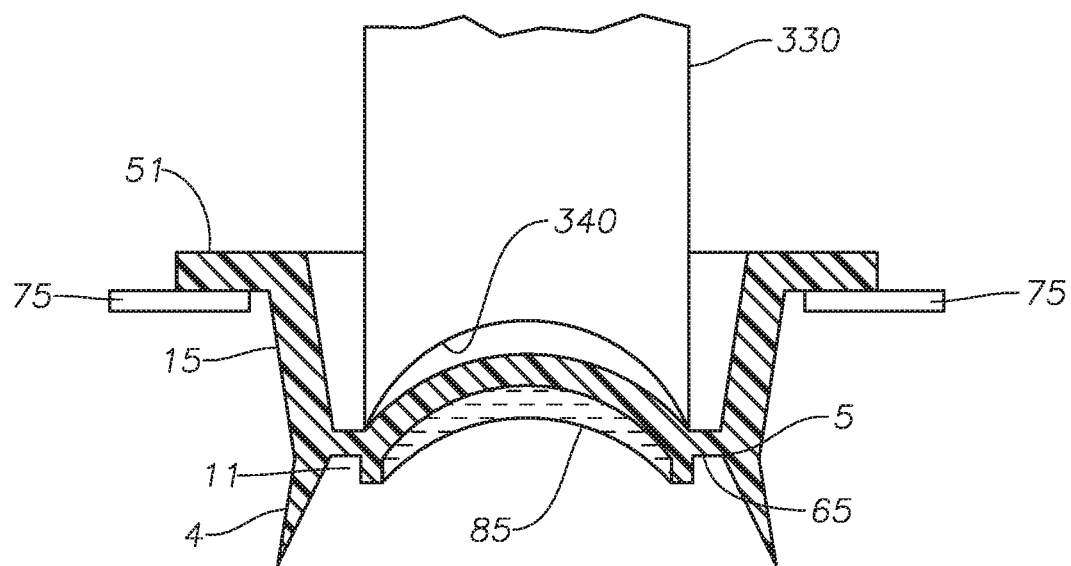

FIGS. 7A and 7B show an embodiment wherein an ultrasonic horn 330 having a concave surface 340 is of a size that allows it to extend within the outer convex portion of female half mold half 1 to contact the center area of the outer convex portion of the female mold half. The female mold half and the contact lens 85 attached thereon is held stationary by a position holder 75. FIG. 7A illustrates that the ultrasonic horn vibrates with the acoustical energy emitted from the ultrasonic horn 330 while the contact lens is attached thereon so that a relative motion at the frequency of the acoustic energy takes place through contact surface between inside of the outer convex portion of female half mold half 1 and the contact lens attached thereon. 7B illustrates that the ultrasonic horn vibrates with the acoustical energy emitted from the ultrasonic horn 330 while the contact lens is attached thereon so that a relative motion at the frequency of the acoustic energy takes place through contact points between edges of the outer concave portion of female half mold half 1 and the contact lens attached thereon.

According to the present invention, the modification to the output part of the horn and the preferred parameters associated with operating the system are given in the following.

The ultrasonic welding system is comprised of a power supply 300 which generates a frequency range from 15 kHz to 70 kHz by the use of solid state power devices. This high frequency electrical energy is supplied to a converter 320. This component changes the electrical energy into ultrasonic mechanical vibratory energy at the frequency of the converted electrical energy supply which is typically 15 kHz to 70 kHz. The vibratory ultrasonic acoustical energy is then transmitted through an amplitude modifying device called a booster 320. The booster is a passive (i.e., non-powered) device which is used to modify the output amplitude of the converter before it reaches the horn 330. The horn is shaped to have a flat surface, convex surface, a concave surface, or the like 340 which is an acoustical tool that transfers the vibratory energy directly to the non-optical surface of a mold half.

The present invention is practiced with the above described apparatus as follows: an ultrasonic welding apparatus as described above, the specific system being used for the investigation is a Dukane iQ Series ES Servo Ultrasonic Welding Press System with a 30 kHz generator, 2:1 booster. The generator creates a user settable, high voltage (~1000 Vrms), 30 kHz signal that is applied to the transducer. The transducer expands and contract with this applied voltage and creates a mechanical vibration at the face of the transducer. This vibration is amplified by the booster and horn assembly. To maximize the effectiveness of the mechanical vibration on the part, the vibration needs to be applied in a prescribed manner.

To operate the Dukane Servo system, the ultrasonic horn is lowered to a point in space, where it begins to look for a reaction force equal to the trigger force set by the user. It will continue to move downward at prescribed speed over a short distance looking for that reaction force. When that force is achieved, the system will fire the ultrasonics. Once fired, the horn will seek to move to maintain that constant force. Force mode was chosen to deal with the normal positional variation you would encounter with different parts placed slightly differently from the previous part, as well as slight geometry variations from part to part. The generator output energy equals to the time integral of power. Example process settings are shown in the following table.

| Process Parameter | Setting |
| --- | --- |
| Generator Frequency | 30 or 40 kHz |
| Booster | 2:1 |
| Horn | 2:1 |
| Trigger Force | 100 N |
| Energy | 0.1-40 J |

According to the present invention, Generator Frequency is operated between 15 kHz to 70 kHz, preferably between 20 kHz to 40 kHz, more preferably between 30 kHz to 40 kHz. Trigger Force is operated between 1.0 N to 150N, preferably between 20 N to 120N, more preferably between 40 N to 110N, still more preferably between 80 N to 100N. Energy is operated between 0.1 J to 40 J, preferably between 0.5 J to 30 J, still more preferably between 1.0 J to 20 J. The duration of applying the ultrasonic vibration energy necessary to separate the molded hydrogel contact lens from the female mold half or the male mold half attached thereon is typically less than 10 seconds, preferably less than 5.0 seconds, more preferably less than 2.0 seconds, still more preferably less than 1.0 second.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

1. A method for producing silicone hydrogel contact lenses, comprising the steps of:

(1) obtaining a polymerizable composition which is clear at room temperature, wherein the polymerizable composition comprises (a) at least one siloxane-containing vinylic monomer, (b) at least one polysiloxane vinylic crosslinker, (c) from about 15% to about 55% by weight of at least one hydrophilic (meth)acrylamido monomer having 3 to 8 carbon atoms, (d) from 0 to about 25% by weight of an organic solvent having relative to the total weight of the polymerizable composition, wherein the organic solvent has 2 to 8 carbon atoms, (e) at least one thermal free radical initiator, and (f) at least one radical scavenger present in an amount for providing the polymerizable composition with a bi-phase curing profile determined by using thermal DSC to polymerization kinetics of the polymerizable composition at a curing temperature of from about 45° C. to about 100° C. as function of time;

(2) introducing the polymerizable composition into a lens mold, wherein the lens mold comprises a male mold half having a first molding surface and a female mold half having a second molding surface, wherein the male and female mold halves are configured to receive each other such that a mold cavity is formed between the first and second molding surfaces when the mold is closed;

(3) curing thermally the polymerizable composition in the lens mold in an oven at the curing temperature for at least 30 minutes to form an unprocessed silicone hydrogel lens contact lens;

(4) separating the lens mold the male and female mold halves, with the unprocessed silicone hydrogel contact lens being adhered on a lens-adhered mold half which is one of the male and female mold halves; and (5) removing the unprocessed silicone hydrogel contact lens from the lens-adhered mold half.

2. The method of embodiment 1, wherein the polymerizable composition comprises from about 20% to about 50% by weight of at least one hydrophilic (meth)acrylamido monomer having 3 to 8 carbon atoms relative to the total weight of the polymerizable composition.

3. The method of embodiment 1, wherein the polymerizable composition comprises from about 25% to about 45% by weight of at least one hydrophilic (meth)acrylamido monomer having 3 to 8 carbon atoms relative to the total weight of the polymerizable composition.

4. The method of any one of embodiments 1 to 3, wherein at least one hydrophilic (meth)acrylamido monomer is (meth)acrylamide, N-methyl (meth)acrylamide, N,N-dimethyl (meth)acrylamide, N-ethyl (meth)acrylamide, N,N-diethyl (meth)acrylamide, N-propyl (meth)acrylamide, N-isopropylacrylamide, N-3-methoxypropyl (meth)acrylamide, N-tert-butylacrylamide, N-2-hydroxyethyl (meth)acrylamide, N,N-bis(2-hydroxyethyl) (meth)acrylamide, N-2-hydroxypropyl (meth)acrylamide, N-3-hydroxypropyl (meth)acrylamide, N-2,3-dihydroxypropyl (meth)acrylamide, N-[tris(hydroxymethyl)methyl]-acrylamide, N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl acrylamide, 2-(meth)acrylamidoglycolic acid, or a combination thereof.

5. The method of any one of embodiments 1 to 3, wherein at least one hydrophilic (meth)acrylamido monomer is (meth)acrylamide, N,N-dimethyl (meth)acrylamide, N-2-hydroxyethyl (meth)acrylamide, or a combination thereof.

6. The method of any one of embodiments 1 to 3, wherein at least one hydrophilic (meth)acrylamido monomer comprises N,N-dimethyl acrylamide.

7. The method of any one of embodiments 1 to 6, wherein the polymerizable composition comprises from about 1% to about 20% by weight of the organic solvent relative to the total weight of polymerizable composition.

8. The method of any one of embodiments 1 to 6, wherein the polymerizable composition comprises from about 2% to about 15% by weight of the organic solvent relative to the total weight of polymerizable composition.

9. The method of any one of embodiments 1 to 6, wherein the polymerizable composition comprises from about 3% to about 10% by weight of the organic solvent relative to the total weight of polymerizable composition.

10. The method of any one of embodiments 1 to 9, wherein the organic solvent is ethanol, 1-propanol, isopropanol, 1-butanol, sec-butanol, isobutanol, tert-butyl alcohol, 1-pentanol, 2-pentanol, 3-pentanol, 3-methyl-2-butanol, 2-methyl-1-butanol, 2,2-dimethyl-1-propanol, tert-amyl alcohol, 1-methoxy-2-propanol, 3-ethoxy-1-propanol, 1-ethoxy-2-propanol, or a combination thereof.

11. The method of any one of embodiments 1 to 10, wherein the polymerizable composition comprises at least about 100 ppm of the radical scavenger relative to the total weight of the polymerizable composition.

12. The method of any one of embodiments 1 to 10, wherein the polymerizable composition comprises at least about 200 ppm of the radical scavenger relative to the total weight of the polymerizable composition.

13. The method of any one of embodiments 1 to 10, wherein the polymerizable composition comprises at least about 300 ppm, of the radical scavenger relative to the total weight of the polymerizable composition.

14. The method of any one of embodiments 1 to 13, wherein the radical scavenger is a N-oxyl or nitroxide compound, a quinone methide, a nitroso compound, phenothiazine, phenols, or a naturally-occurring antioxidant free-radical scavenger.

15. The method of any one of embodiments 1 to 13, wherein the radical scavenger is 4-hydroxy-2,2,6,6,-tetramethyl-1-piperidinyloxy in free radical form.

16. The method of any one of embodiments 1 to 15, wherein the polymerizable composition in the lens mold in an oven is cured for at least about 40 minutes.

17. The method of any one of embodiments 1 to 15, wherein the polymerizable composition in the lens mold in an oven is cured for at least about 50 minutes.

18. The method of any one of embodiments 1 to 15, wherein the polymerizable composition in the lens mold in an oven is cured for at least about 60 minutes.

19. The method of any one of embodiments 1 to 18, wherein the polymerizable composition in the lens mold is thermally cured in the oven at the curing temperature under a nitrogen environment, wherein the nitrogen environment in the oven is maintained by flowing nitrogen gas through the oven at a first flow rate.

20. The method of any one of embodiments 1 to 19, wherein the organic solvent has a boiling point of lower than 105° C., wherein the method further comprises, between steps (3) and (4), the steps of: raising oven temperature to a post-curing temperature of about 110° C. or higher while increasing the flow rate of nitrogen gas through the oven to a second flow rate which is at least about 2.0 folds of the first flow rate; and heating the lens mold with the unprocessed silicone hydrogel contact lens therewithin in the oven at the post-curing temperature under nitrogen gas flow through the oven at the second flow rate for at least about 30 minutes.

21. The method of embodiment 20, wherein the post-curing temperature is at least about 115° C.

22. The method of embodiment 20, wherein the post-curing temperature is at least about 120° C.

23. The method of any one of embodiments 20 to 22, wherein the second flow rate is at least about 3.0 folds of the first flow rate.

24. The method of any one of embodiments 20 to 22, wherein the second flow rate is at least about 4.0 folds of the first flow rate.

25. The method of any one of embodiments 1 to 24, wherein the lens mold with the unprocessed silicone hydrogel contact lens therewithin is heated in the oven at the post-curing temperature for at least about 60 minutes.

26. The method of any one of embodiments 1 to 24, wherein the lens mold with the unprocessed silicone hydrogel contact lens therewithin is heated in the oven at the post-curing temperature for at least about 90 minutes.

27. The method of any one of embodiments 1 to 24, wherein the lens mold with the unprocessed silicone hydrogel contact lens therewithin is heated in the oven at the post-curing temperature for at least about 120 minutes.

28. The method of any one of embodiments 1 to 27, wherein the sum of the amounts of components (a) to (d) is at least about 90% by weight relative to the total weight of the polymerizable composition.

29. The method of any one of embodiments 1 to 27, wherein the sum of the amounts of components (a) to (d) is at least about 93% by weight relative to the total weight of the polymerizable composition.

30. The method of any one of embodiments 1 to 27, wherein the sum of the amounts of components (a) to (d) is at least about 95% by weight relative to the total weight of the polymerizable composition.

31. The method of any one of embodiments 1 to 27, wherein the sum of the amounts of components (a) to (d) is at least about 98% by weight relative to the total weight of the polymerizable composition.

32. The method of any one of embodiments 1 to 31, wherein said at least one siloxane-containing vinylic monomer is a vinylic monomer of formula (M1) or (M2)

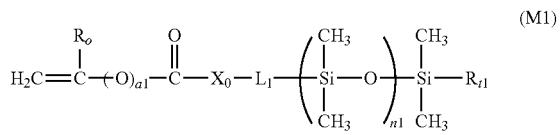

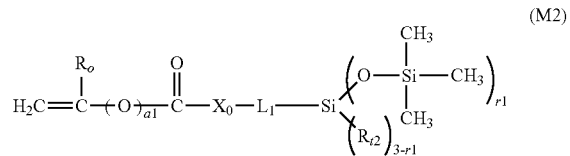

in which: a1 is zero or 1; $R_o$ is H or methyl; $X_o$ is O or $NR_1$; $L_1$ is a $C_{2-8}$ alkylene divalent radical or a divalent radical of

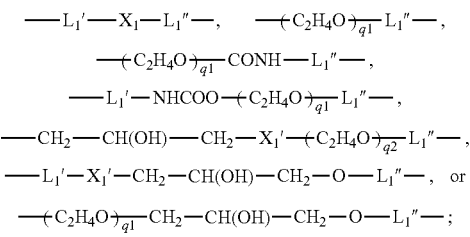

$L_1'$ is a $C_2$-$C_8$ alkylene divalent radical which has zero or one hydroxyl group; $L_1''$ is $C_3$-$C_8$ alkylene divalent radical which has zero or one hydroxyl group; $X_1$ is O, $NR_1$, NHCOO, OCONH, $CONR_1$, or $NR_1CO$; $R_1$ is H or a $C_1$-$C_4$ alkyl having 0 to 2 hydroxyl group; $R_{r1}$ and $R_{r2}$ independent of each other are a $C_1$-$C_4$ alkyl; $X_1'$ is O or $NR_1$; q1 is an integer of 1 to 20; q2 is an integer of 0 to 20; n1 is an integer of 3 to 25; and r1 is an integer of 2 or 3.

33. The method of any one of embodiments 1 to 31, wherein said at least one siloxane-containing vinylic monomer is tris(trimethylsilyloxy)silylpropyl (meth)acrylate, [3-(meth) acryloxy-2-hydroxypropyloxy]propylbis(trimethylsiloxy) methylsilane, [3-(meth)acryloxy-2-hydroxypropyloxy]propylbis(trimethylsiloxy)butylsilane, 3-(meth)acryloxy-2-(2-hydroxyethoxy)-propyloxy)propylbis(trimethylsiloxy) methylsilane, 3-(meth)acryloxy-2-hydroxypropyloxy) propyltris(trimethylsiloxy)silane, N-[tris(trimethylsiloxy)silylpropyl]-(meth)acrylamide, N-(2-hydroxy-3-(3-(bis(trimethylsilyloxy)methylsilyl)propyloxy)-propyl)-2-methyl (meth)acrylamide, N-(2-hydroxy-3-(3-(bis(trimethylsilyloxy)methylsilyl)-propyloxy)propyl) (meth)acrylamide, N-(2-hydroxy-3-(3-(tris(trimethylsilyloxy)silyl)-propyloxy) propyl)-2-methyl acrylamide, N-(2-hydroxy-3-(3-(tris(trimethylsilyloxy)silyl)-propyloxy)propyl) (meth)acrylamide, N-[tris(dimethylpropylsiloxy)silylpropyl]-(meth)acrylamide, N-[tris(dimethylphenylsiloxy) silylpropyl] (meth)acrylamide, N-[tris(dimethylethylsiloxy)silylpropyl] (meth) acrylamide, N,N-bis[2-hydroxy-3-(3-(bis(trimethylsilyloxy) methylsilyl)propyloxy)propyl]-2-methyl (meth)acrylamide, N,N-bis[2-hydroxy-3-(3-(bis(trimethylsilyloxy) methylsilyl)propyloxy)-propyl] (meth)acrylamide, N,N-bis[2-hydroxy-3-(3-(tris(trimethylsilyloxy)silyl)propyloxy)-propyl]-2-methyl (meth)acrylamide, N,N-bis[2-hydroxy-3-(3-(tris (trimethylsilyloxy)-silyl)propyloxy)propyl] (meth) acrylamide, N-[2-hydroxy-3-(3-(t-butyldimethylsilyl)-propyloxy)propyl]-2-methyl (meth)acrylamide, N-[2-hydroxy-3-(3-(t-butyldimethylsilyl)propyloxy)propyl] (meth)acrylamide, N,N-bis[2-hydroxy-3-(3-(t-butyldimethylsilyl)propyloxy)propyl]-2-methyl (meth)acrylamide, N-2-(meth)acryloxyethyl-O-(methyl-bis-trimethylsiloxy-3-propyl)silyl carbamate, 3-(trimethylsilyl)propylvinyl carbonate, 3-(vinyloxycarbonylthio)-propyl-tris(trimethyl-siloxy)silane, 3-[tris(trimethylsiloxy)silyl]propylvinyl carbamate, 3-[tris(trimethylsiloxy)silyl] propyl allyl carbamate, 3-[tris (trimethylsiloxy)silyl]propyl vinyl carbonate, or a combination thereof.

34. The method of any one of embodiments 1 to 31, wherein said at least one siloxane-containing vinylic monomer is tris(trimethylsilyloxy)silylpropyl (meth)acrylate, [3-(meth) acryloxy-2-hydroxypropyloxy]propylbis(trimethylsiloxy) methylsilane, [3-(meth)acryloxy-2-hydroxypropyloxy]propylbis(trimethylsiloxy)butylsilane, 3-(meth)acryloxy-2-(2-hydroxyethoxy)-propyloxy)propylbis(trimethylsiloxy) methylsilane, 3-(meth)acryloxy-2-hydroxypropyloxy) propyltris(trimethylsiloxy)silane, or a combination thereof.

35. The method of any one of embodiments 1 to 31, wherein said at least one siloxane-containing vinylic monomer is N-[tris(trimethylsiloxy)silylpropyl]-(meth)acrylamide, N-(2-hydroxy-3-(3-(bis(trimethylsilyloxy) methylsilyl)propyloxy)-propyl)-2-methyl (meth)acrylamide, N-(2-hydroxy-3-(3-(bis(trimethylsilyloxy)methylsilyl)-propyloxy)propyl) (meth)acrylamide, N-(2-hydroxy-3-(3-(tris(trimethylsilyloxy)silyl)-propyloxy)propyl)-2-methyl acrylamide, N-(2-hydroxy-3-(3-(tris(trimethylsilyloxy)silyl)-propyloxy)propyl) (meth)acrylamide, or a combination thereof.

36. The method of any one of embodiments 1 to 31, wherein said at least one siloxane-containing vinylic monomer is α-(meth)acryloxypropyl terminated ω-$C_1$-$C_4$-alkyl terminated polydimethylsiloxane, α-(meth)acryloxy-2-hydroxypropyloxypropyl terminated ω-$C_1$-$C_4$-alkyl terminated polydimethylsiloxane, α-(2-hydroxyl-methacryloxypropyloxypropyl)-ω-$C_1$-$C_4$-alkyl-decamethylpentasiloxane, α-[3-(meth)acryloxyethoxy-2-hydroxypropyloxypropyl]-terminated ω-$C_1$-$C_4$-alkyl terminated polydimethylsiloxane, α-[3-(meth)acryloxy-propyloxy-2-hydroxypropyloxypropyl]-terminated ω-$C_1$-$C_4$-alkyl terminated polydimethylsiloxane, α-[3-(meth)acryloxyisopropyloxy-2-hydroxypropyloxypropyl]-terminated ω-$C_1$-$C_4$-alkyl terminated polydimethylsiloxane, α-[3-(meth)acryloxybutyloxy-2-hydroxypropyloxypropyl]-terminated ω—$C_1$-$C_4$-alkyl terminated polydimethylsiloxane, α-[3-(meth)acryloxyethylamino-2-hydroxypropyloxypropyl]-terminated ω-$C_1$-$C_4$-alkyl terminated polydimethylsiloxane, α-[3-(meth)acryloxypropylamino-2-hydroxypropyloxypropyl]-terminated ω-$C_1$-$C_4$-alkyl terminated polydimethylsiloxane, α-[3-(meth)acryloxy-butylamino-2-hydroxypropyloxypropyl]-terminated ω-$C_1$-$C_4$-alkyl terminated polydimethylsiloxane, α-[(meth)acryloxy(polyethylenoxy)-2-hydroxypropyloxypropyl]-terminated ω-$C_1$-$C_4$-alkyl terminated polydimethylsiloxane, α-[(meth)acryloxy-2-hydroxypropyloxy-ethoxypropyl]-terminated ω-$C_1$-$C_4$-alkyl terminated polydimethylsiloxane, α-[(meth)acryloxy-2-hydroxypropyl-N-ethylaminopropyl]-terminated ω—$C_1$-$C_4$-alkyl terminated polydimethylsiloxane, α-[(meth)acryloxy-2-hydroxypropyl-aminopropyl]-terminated ω-$C_1$-$C_4$-alkyl terminated polydimethylsiloxane, α-[(meth)acryloxy-2-hydroxypropyloxy-(polyethylenoxy)propyl]-terminated ω-$C_1$-$C_4$-alkyl terminated polydimethylsiloxane, α-(meth)acryloylamidopropyloxypropyl terminated ω-$C_1$-$C_4$-alkyl terminated polydimethylsiloxane, α-N-methyl-(meth)acryloylamidopropyloxypropyl terminated ω-$C_1$-$C_4$-alkyl terminated polydimethylsiloxane, α-[3-(meth)acrylamidoethoxy-2-hydroxypropyloxy-propyl]-terminated ω-$C_1$-$C_4$-alkyl polydimethylsiloxane, α-[3-(meth)acrylamidopropyloxy-2-hydroxypropyloxypropyl]-terminated ω-$C_1$-$C_4$-alkyl terminated polydimethylsiloxane, α-[3-(meth)acrylamidoisopropyloxy-2-hydroxypropyloxypropyl]-terminated ω-$C_1$-$C_4$-alkyl terminated polydimethylsiloxane, α-[3-(meth) acrylamidobutyloxy-2-hydroxypropyloxypropyl]-terminated ω-$C_1$-$C_4$-alkyl terminated polydimethylsiloxane, α-[3-(meth)acryloylamido-2-hydroxypropyloxypropyl] terminated ω-$C_1$-$C_4$-alkyl polydimethylsiloxane, α-[3-[N-methyl-(meth)acryloylamido]-2-hydroxypropyloxypropyl] terminated ω-$C_1$-$C_4$-alkyl terminated polydimethylsiloxane, N-methyl-N'-(propyltetra(dimethylsiloxy)dimethylbutylsilane) (meth)acrylamide, N-(2,3-dihydroxypropane)-N'-(propyltetra(dimethylsiloxy)dimethylbutylsilane) (meth)acrylamide, (meth)acryloylamidopropyltetra(dimethylsiloxy) dimethylbutylsilane, α-vinyl carbonate-terminated ω-$C_1$-$C_4$-alkyl-terminated polydimethylsiloxanes, α-vinyl carbamate-terminated ω—$C_1$-$C_4$-alkyl-terminated polydimethylsiloxane, or a mixture thereof.

37. The method of any one of embodiments 1 to 36, wherein said at least one polysiloxane vinylic crosslinker is a vinylic crosslinker of formula (I)

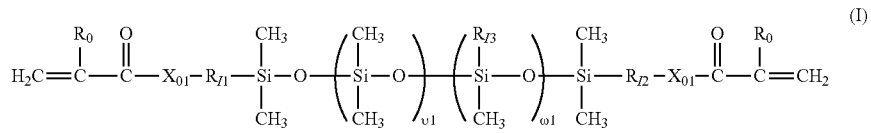

in which:

$v1$ is an integer of from 30 to 500 and $\omega 1$ is an integer of from 1 to 75, provided that $\omega 1/v1$ is from about 0.035 to about 0.15;

$X_{01}$ is O or $NR_N$ in which $R_N$ is hydrogen or $C_1$-$C_{10}$-alkyl;

$R_o$ is hydrogen or methyl;

$R_{I1}$ and $R_{I2}$ independently of each other are a substituted or unsubstituted $C_1$-$C_{10}$ alkylene divalent radical or a divalent radical of —$R_{I4}$—O—$R_{I5}$— in which $R_{I4}$ and $R_{I5}$ independently of each other are a substituted or unsubstituted $C_1$-$C_{10}$ alkylene divalent radical;

$R_{I3}$ is a monovalent radical of any one of formula (Ia) to (Ie)

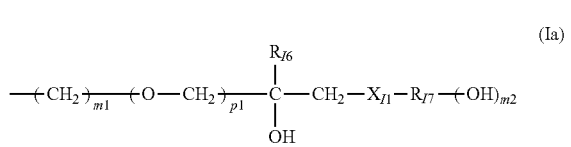
(Ia)

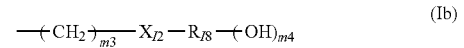
(Ib)

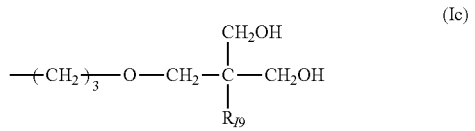
(Ic)

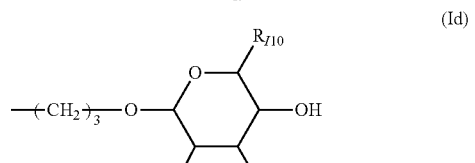
(Id)

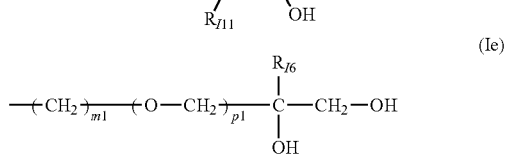
(Ie)

p1 is zero or 1; m1 is an integer of 2 to 4; m2 is an integer of 1 to 5; m3 is an integer of 3 to 6; m4 is an integer of 2 to 5;

$R_{I6}$ is hydrogen or methyl;
$R_{I7}$ is a $C_2$-$C_6$ hydrocarbon radical having (m2+1) valencies;
$R_{I8}$ is a $C_2$-$C_6$ hydrocarbon radical having (m4+1) valencies;
$R_{I9}$ is ethyl or hydroxymethyl;
$R_{I10}$ is methyl or hydromethyl;
$R_{I11}$ is hydroxyl or methoxy;
$X_{I1}$ is a sulfur linkage of —S— or a teriary amino linkage of —$NR_{I12}$— in which $R_{I12}$ is $C_1$-$C_1$ alkyl, hydroxyethyl, hydroxypropyl, or 2,3-dihydroxypropyl; and
$X_{I2}$ is an amide linkage of

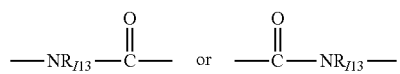

in which $R_{I13}$ is hydrogen or $C_1$-$C_{10}$ alkyl.

38. The method of any one of embodiments 1 to 36, wherein said at least one polysiloxane vinylic crosslinker is a vinylic crosslinker of formula (A)

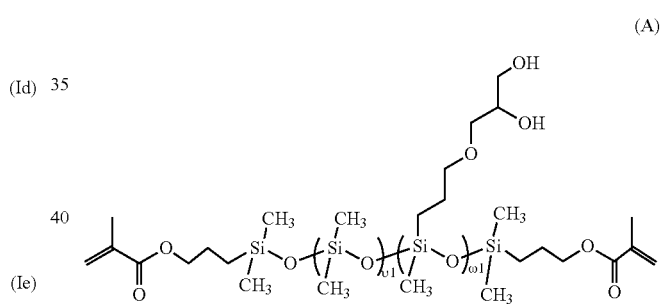

in which v1 is an integer of from 30 to 500 and ω1 is an integer of from 1 to 75, provided that ω1/v1 is from about 0.035 to about 0.15.

39. The method of any one of embodiments 1 to 36, wherein said at least one polysiloxane vinylic crosslinker is a vinylic crosslinker of any one of formula (1) to (7)

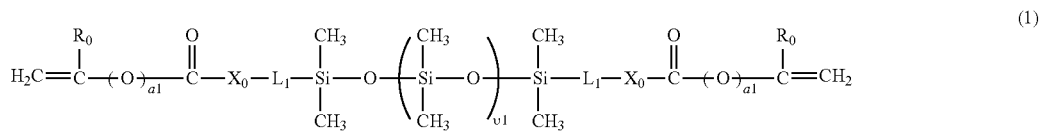
(1)

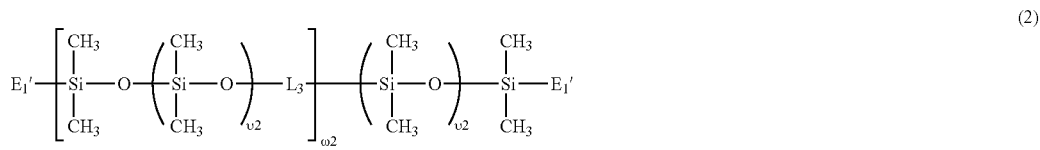
(2)

-continued

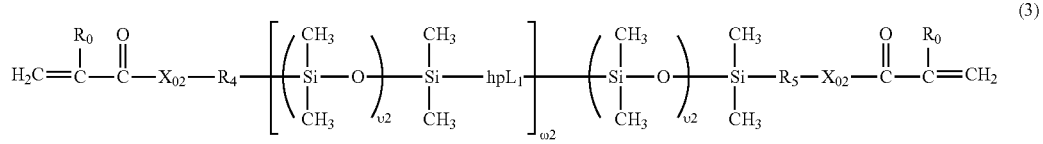
(3)

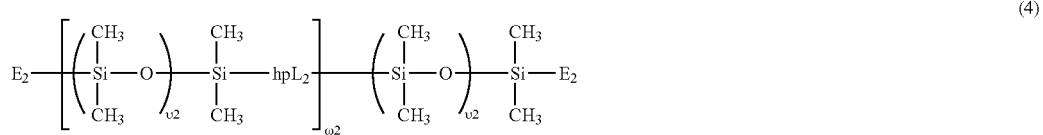
(4)

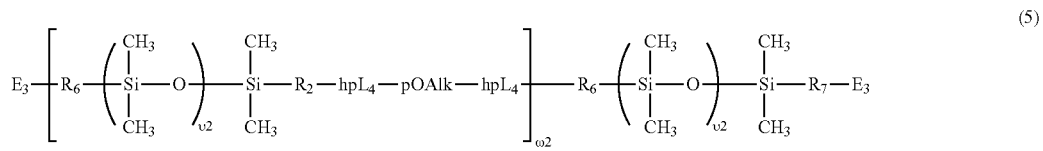
(5)

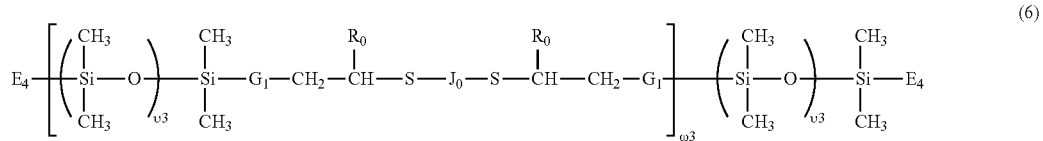
(6)

in which:

v1 is an integer of from 30 to 500;

v2 is an integer of from 5 to 50;

v3 is an integer of from 5 to 100;

ω2 and ω3 independent of each other are an integer of from 1 to 15;

a1 and g1 independent of each other is zero or 1;

h1 is an integer of 1 to 20 and h2 is an integer of 0 to 20;

m1 and m3 independent of each other is 0 or 1, m2 is an integer of 1 to 6, m4 is an integer of 1 to 5, m5 is 2 or 3;

q1 is an integer of 1 to 20, q2 is an integer of 0 to 20, q3 is an integer of 0 to 2, q4 is an integer of 2 to 50, q5 and q6 independent of each other are a number of 0 to 35, provided that (q4+q5+q6) is an integer of 2 to 50;

x+y is an integer of from 10 to 30;

e1 is an integer of 5 to 100, p1 and b1 independent of each other are an integer of 0 to 50, provided that (e1+p1+b1)≥10 and e1/(p1+b1)≥2 when (p1+b1)≥1;

$R_o$ is H or methyl;

$R_1$, $R_{1n}$, $R_{2n}$, $R_{3n}$, and $R_{4n}$ independent of one another are H or a $C_1$-$C_4$ alkyl having 0 to 2 hydroxyl group;

$R_{n5}$ is H or a $C_1$-$C_{10}$ alkyl;

$R_2$ is a $C_4$-$C_{14}$ hydrocarbon divalent radical;

$R_3$ is a $C_2$-$C_6$ alkylene divalent radical;

$R_4$ and $R_5$ independent of each other are a $C_1$-$C_6$ alkylene divalent radical or a $C_1$-$C_6$ alkylene-oxy-$C_1$-$C_6$ alkylene divalent radical;

$R_6$ and $R_7$ independent of each other are a $C_1$-$C_6$ alkylene divalent radical or a $C_1$-$C_6$ alkoxy-$C_1$-$C_6$ alkylene divalent radical;

$R_8$ and $R_9$ independent of each other are a substituted or unsubstituted $C_1$-$C_2$ alkylene divalent radical;

$X_o$, $X_1'$, $X_{o1}$, $X_{o2}$, and $X_{o3}$ independent of one another are O or $NR_1$;

$X_1$ is O, $NR_1$, NHCOO, OCONH, $CONR_1$, or $NR_1CO$;

$X_{o4}$ is —COO— or —$CONR_{n5}$—;

$X_{o5}$ and $X_{o7}$ independent of each other are a direct bond, —COO— or —$CONR_{n5}$—;

$X_{o6}$ is a direct bond, a $C_1$-$C_6$ alkylene divalent radical, a $C_1$-$C_6$ alkylenoxy divalent radical, —COO—, or —$CONR_{n5}$—;

$X_{o8}$ is a direct bond or —COO—;

$X_{o9}$ is O or $NR_{n5}$;

$X_{10}$ is a direct bond, a $C_1$-$C_6$ alkylene divalent radical, —COO—, or —$CONR_{n5}$—;

$E_1'$ is a monovalent radical of

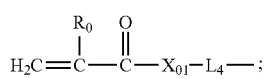

$E_2$ is a monovalent radical of

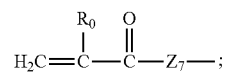

$E_3$ is a monovalent radical of

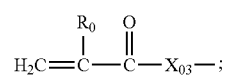

$E_4$ is a monovalent radical of

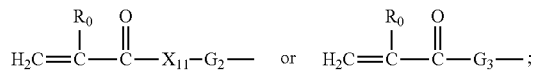  or  ;

$L_1$ is a $C_2$-$C_8$ alkylene divalent radical or a divalent radical of

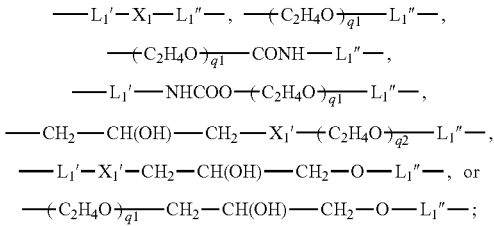

$L_1'$ is a $C_2$-$C_8$ alkylene divalent radical which has zero or one hydroxyl group;
$L_1''$ is $C_3$-$C_8$ alkylene divalent radical which has zero or one hydroxyl group;
$L_3$ is a divalent radical of

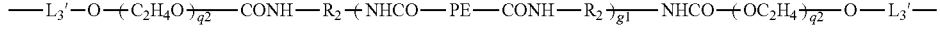

in which PE is a divalent radical of

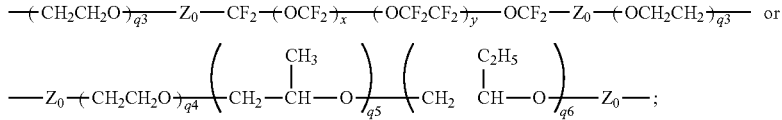

$L_3'$ is $C_3$-$C_8$ alkylene divalent radical;
$L_4$ is a divalent radical of

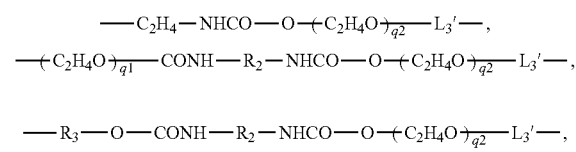

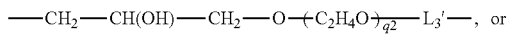

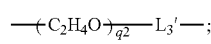

$hpL_1$ is a divalent radical of

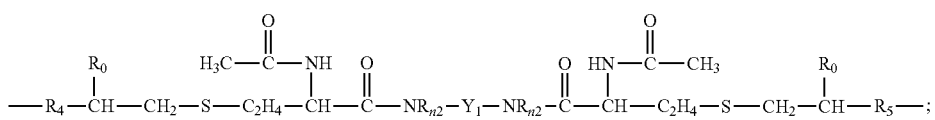

$hpL_2$ is a divalent radical of

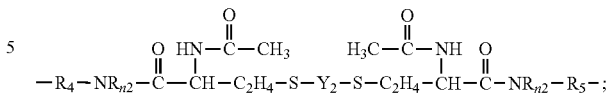

$hpL_3$ is a divalent radical of

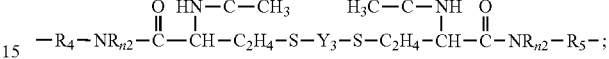

$hpL_4$ is a divalent radical of

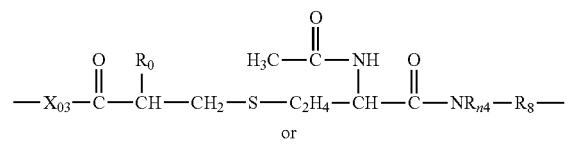

-continued $$—R_9—NR_{n4}—\overset{O}{\underset{||}{C}}—\overset{HN-\overset{O}{\underset{||}{C}}-CH_3}{\underset{|}{CH}}—C_2H_4—S—CH_2—\overset{R_0}{\underset{|}{CH}}—\overset{O}{\underset{||}{C}}—X_{03}—;$$

pOAlk is a divalent radical of $$—(EO)_{e1}(PO)_{p1}(BO)_{b1}—$$

in which EO is an oxyethylene unit (—$CH_2CH_2O$—), PO is an oxypropylene unit $$(\ -CH_2-CH(CH_3)-O-\ ),$$

and BO is an oxybutylene unit $$(\ -CH_2-CH(C_2H_5)-O-\ );$$

$M_0$ is $C_3$-$C_8$ alkylene divalent radical;
$M_1$ is a $C_4$-$C_{14}$ hydrocarbon divalent radical;
$M_2$ and $M_3$ independent of each other are a $C_1$-$C_6$ alkylene divalent radical;
$J_0$ is a $C_1$-$C_2$ hydrocarbon radical having 0 to 2 hydroxyl or carboxyl groups;
$G_1$ is a direct bond, a $C_1$-$C_4$ alkylene divalent radical, or a bivalent radical of $$-X_{04}-(C_2H_4O)_{\overline{h1}}-CONH-M_1-NHCO-O-(C_2H_4O)_{\overline{h2}}-M_0-,$$

$$-X_{05}-M_2-O-CONH-M_1-NHCO-O-(C_2H_4O)_{\overline{h2}}-M_0-,$$

$$-X_{06}-CH_2-CH(OH)-CH_2-O-(C_2H_4O)_{\overline{h2}}-M_0-,$$

$$-X_{07}-(C_2H_4O)_{\overline{h2}}-M_0-;$$

$$-X_{08}-M_3-NHCOO-(C_2H_4O)_{\overline{h1}}-M_0-,$$

$$-X_{10}-CH_2-CH(OH)-CH_2-X_{09}-(C_2H_4O)_{\overline{h2}}-M_0-,$$

$$-X_{07}-M_3-X_{09}-CH_2-CH(OH)-CH_2-O-M_0-, \text{ or}$$

$$-X_{08}-(C_2H_4O)_{\overline{h1}}-CH_2-CH(OH)-CH_2-O-M_0-$$

in which $M_0$ is linked to Si atom while $X_{04}$ to $X_{10}$ are linked to the group of —$CH_2$— in formula (7) and at least one of $J^0$ and $G_1$ in formula (7) comprises at least one moieties selected from the group consisting of hydroxyl groups, urethane linkage of —OCONH—, amino groups of —NHR°, amino linkages of —NH—, amide linkages of —CONH—, carboxyl groups, and combinations thereof;
$G_2$ is a $C_1$-$C_4$ alkylene divalent radical or a bivalent radical of $$-(C_2H_4O)_{\overline{h1}}-CONH-M_1-NHCO-O-(C_2H_4O)_{\overline{h2}}-M_0-,$$

$$-M_2-O-CONH-M_1-NHCO-O-(C_2H_4O)_{\overline{h2}}-M_0-,$$

$$-CH_2-CH(OH)-CH_2-O-(C_2H_4O)_{\overline{h2}}-M_0-,$$

$$-(C_2H_4O)_{\overline{h2}}-M_0-;\ -M_3-NHCOO-(C_2H_4O)_{\overline{h1}}-M_0-,$$

$$-CH_2-CH(OH)-CH_2-X_{09}-(C_2H_4O)_{\overline{h2}}-M_0-,$$

$$-M_3-X_{09}-CH_2-CH(OH)-CH_2-O-M_0-, \text{ or}$$

$$-(C_2H_4O)_{\overline{h1}}-CH_2-CH(OH)-CH_2-O-M_0-;$$

$G_3$ is a divalent radical of $$-G_4-(C)_{\overline{h3}}^{O}-CH(R_0)-CH_2-S-J_0-S-CH_2-CH(R_0)-(C)_{\overline{h4}}^{O}-G_2-$$

in which h3 and h4 independent of each other are 1 or 0; $G_4$ is a divalent radical of any one of (a) —$NR_3'$— in which $R_3'$ is hydrogen or $C_1$-$C_3$ alkyl, (b)

$$-N\overset{\frown}{\underset{\smile}{\phantom{N}}}N-,$$

(c) —$NR_0$-$G_5$-$NR_0$— in which $G_5$ is a $C_1$-$C_6$ alkylene divalent radical, 2-hydroxylpropylene divalent radical, 2-(phosphonyloxy)propylene divalent radical, 1,2-dihydroxyethylene divalent radical, 2,3-dihydroxybutylene divalent radical, and (d) —O-$G_6$-O— in which $G_6$ is a $C_1$-$C_6$ alkylene divalent radical, a divalent radical of $$-(CH_2-CH(OH)-CH_2-O)_{\overline{h4'}}-CH_2-CH(OH)-CH_2-$$

in which h4' is 1 or 2, a divalent radical of $$-CH_2-CH(OH)-CH_2-O-CH_2-CH_2-O-CH_2-CH(OH)-CH_2-,$$

a divalent radical of $$-(CH_2-CH_2-O)_{\overline{h5}}-CH_2-CH_2-$$

in which h5 is an integer of 1 to 5, a divalent radical of $$-(CH_2)_{\overline{h6}}-O-\overset{O}{\underset{OH}{P}}-O-(CH_2)_{\overline{m5}}-$$

in which h6 is 2 or 3, or a substituted $C_3$-$C_8$ alkylene divalent radical having a hydroxyl group or phosphonyloxy group;
$Y_1$ is a $C_1$-$C_6$ alkylene divalent radical, 2-hydroxylpropylene divalent radical, 2-(phosphonyloxy)propylene divalent radical, 1,2-dihydroxyethylene divalent radical, a divalent radical of $$-N\overset{\frown}{\underset{\smile}{\phantom{N}}}N-,$$

or a divalent radical of

[structure: trimethyl-ethyl substituted cyclohexane with $H_3C$, $CH_3$, $H_3C$, $H_3C$ substituents];

$Y_2$ is a divalent radical of

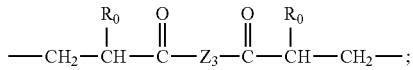

$Y_3$ is a divalent radical of

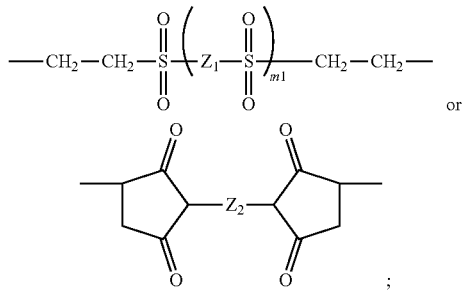

$Z_0$ is a direct bond or a $C_1$-$C_{12}$ alkylene divalent radical;
$Z_1$ is a $C_1$-$C_6$ alkylene divalent radical, a hydroxyl- or methoxy-substituted $C_1$-$C_6$ alkylene divalent radical, or a substituted or unsubstituted phenylene divalent radical,
$Z_2$ is a $C_1$-$C_6$ alkylene divalent radical, a hydroxyl- or methoxy-substituted $C_1$-$C_6$ alkylene divalent radical, a dihydroxyl- or dimethoxy-substituted $C_2$-$C_6$ alkylene divalent radical, a divalent radical of —$C_2H_4$—(O—$C_2H_4$)$_{m2}$—, a divalent radical of —$Z_4$—S—S—$Z_4$—, a hydroxyl- or methoxy-substituted $C_1$-$C_6$ alkylene divalent radical, or a substituted or unsubstituted phenylene divalent radical,
$Z_3$ is a divalent radical of any one of (a) —$NR_{n3}$—,

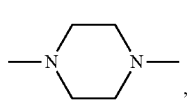 (b)

(c) —$NR_0$—$Z_5$—$NR_0$—, and (d) —O—$Z_6$—O—,
$Z_4$ is a $C_1$-$C_6$ alkylene divalent radical,
$Z_5$ is a $C_1$-$C_6$ alkylene divalent radical, 2-hydroxylpropylene divalent radical, 2-(phosphonyloxy)propylene divalent radical, 1,2-dihydroxyethylene divalent radical, 2,3-dihydroxybutylene divalent radical,
$Z_6$ is (a) a $C_1$-$C_6$ alkylene divalent radical, (b) a divalent radical of

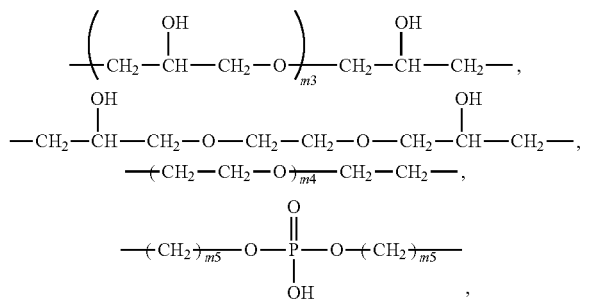

or (c) a substituted $C_3$-$C_8$ alkylene divalent radical having a hydroxyl group or phosphonyloxy group, $Z_7$ is a divalent radical of

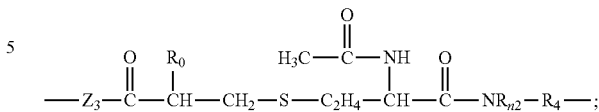

and
$Z_8$ is a divalent radical of

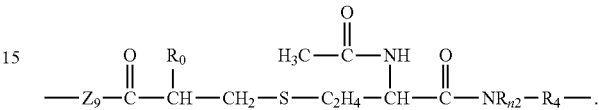

40. The method of any one of embodiments 1 to 36, wherein the polymerizable materials comprise at least one silicone-containing vinylic crosslinker which is α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, a, ω-bis[3-(meth)acrylamidopropyloxy-2-hydroxypropyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane, or a combination thereof.

41. The method of any one of embodiments 1 to 40, wherein the polymerizable composition further comprises about 10% or less by weight of one or more polymerizable components selected from the group consisting of an N-vinyl amide monomer, a hydrophilic (meth)acryloxy monomer, a hydrophobic acrylic monomer capable of forming a homopolymer with a $T_g$ of at least about 60° C., a non-silicone vinylic crosslinker, and combinations thereof, relative to the total weight of the polymerizable composition.

42. The method of any one of embodiments 1 to 40, wherein the polymerizable composition further comprises about 8% or less by weight of one or more polymerizable components selected from the group consisting of an N-vinyl amide monomer, a hydrophilic (meth)acryloxy monomer, a hydrophobic acrylic monomer capable of forming a homopolymer with a $T_g$ of at least about 60° C., a non-silicone vinylic crosslinker, and combinations thereof, relative to the total weight of the polymerizable composition.

43. The method of any one of embodiments 1 to 40, wherein the polymerizable composition further comprises about 6% or less by weight of one or more polymerizable components selected from the group consisting of an N-vinyl amide monomer, a hydrophilic (meth)acryloxy monomer, a hydrophobic acrylic monomer capable of forming a homopolymer with a $T_g$ of at least about 60° C., a non-silicone vinylic crosslinker, and combinations thereof, relative to the total weight of the polymerizable composition.

44. The method of any one of embodiments 1 to 40, wherein the polymerizable composition further comprises about 4% or less by weight or less of one or more polymerizable components selected from the group consisting of an N-vinyl amide monomer, a hydrophilic (meth)acryloxy monomer, a hydrophobic acrylic monomer capable of forming a homopolymer with a $T_g$ of at least about 60° C., a non-silicone vinylic crosslinker, and combinations thereof, relative to the total weight of the polymerizable composition.

45. The method of any one of embodiments 41 to 44, wherein the polymerizable composition comprises N-vinyl amide monomer selected from the group consisting of N-vinylpyrrolidone, N-vinyl piperidone, N-vinyl caprolactam, N-vinyl-N-methyl acetamide, N-vinyl formamide, N-vinyl acetamide, N-vinyl isopropylamide, N-vinyl-N-methyl acetamide, N-vinyl-N-ethyl acetamide, N-vinyl-N-ethyl formamide, and mixtures thereof. Preferably, the N-vinyl amide monomer is N-vinylpyrrolidone, N-vinyl-N-methyl acetamide, and combinations thereof.

46. The method of any one of embodiments 41 to 45, wherein the polymerizable composition comprises the hydrophilic (meth)acryloxy monomer selected from the group consisting of 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a weight average molecular weight of up to 1500, (meth)acrylic acid, ethylacrylic acid, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth) acrylate, and combinations thereof.

47. The method of any one of embodiments 41 to 46, wherein the polymerizable composition comprises the hydrophobic acrylic monomer selected from the group consisting of methyl methacrylate, ethyl methacrylate, isopropyl methacrylate, sec-butyl methacrylate, tert-butyl methacrylate, cyclohexyl methacrylate, isobornyl acrylate, isobornyl methacrylate, phenyl methacrylate, 4-tert-butylstyrene, 2-methylstyrene, styrene, 4-ethoxystyrene, 2,4-dimethystyrene, 2,5-dimethylstyrene, 3,5-dimethylstyrene, and combinations thereof.

48. The method of any one of embodiments 41 to 46, wherein the polymerizable composition comprises the hydrophobic acrylic monomer selected from the group consisting of methyl methacrylate, tert-butyl methacrylate, or a combination thereof.

49. The method of any one of embodiments 41 to 48, wherein the polymerizable composition comprises from about 1.5% or less by weight of the non-silicone vinylic crosslinker relative to the total weight of all polymerizable components in the polymerizable composition, wherein the non-silicone vinylic crosslinker is ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth) acrylate, bis[2-(meth)acryloxyethyl] phosphate, trimethylolpropane di-(meth)acrylate, and 3,4-bis[(meth)acryloyl]tetrahydrofuan, diacrylamide (i.e., N-(1-oxo-2-propenyl)-2-propenamide), dimethacrylamide (i.e., N-(1-oxo-2-methyl-2-propenyl)-2-methyl-2-propenamide), N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamide-propane-2-yl dihydrogen phosphate (i.e., N,N'-2-phophonyloxypropylene bis(meth)acrylamide), piperazine diacrylamide (or 1,4-bis(meth)acryloyl piperazine), tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, or combinations thereof.

50. The method of any one of embodiments 41 to 48, wherein the polymerizable composition comprises from about 1.5% or less by weight of the non-silicone vinylic crosslinker relative to the total weight of all polymerizable components in the polymerizable composition, wherein the non-silicone vinylic crosslinker is tetra(ethyleneglycol) di-(meth)acrylate, tri(ethyleneglycol) di-(meth)acrylate, ethyleneglycol di-(meth)acrylate, di(ethyleneglycol) di-(meth)acrylate, tetraethyleneglycol divinyl ether, triethyleneglycol divinyl ether, diethyleneglycol divinyl ether, ethyleneglycol divinyl ether, triallyl isocyanurate, triallyl cyanurate, or a combination thereof.

51. The method of any one of embodiments 1 to 50, wherein the step (5) of removing is performed, before the unprocessed silicone hydrogel contact lens is contact with water or any liquid, by (a) bring a ultrasonic horn in direct contact with at least one area of a non-optical surface of the lens-adhered mold half having the unprocessed silicone hydrogel lens precursor attached thereon and (b) applying a ultrasonic vibrational energy of from about 0.2 to about 18 J to the at least one area of the non-optical surface of the lens-adhered mold half having the unprocessed silicone hydrogel contact lens adhered thereon so as to remove the unprocessed silicone hydrogel contact lens from the lens-adhered mold half.

52. The method of embodiment 51, wherein the ultrasonic horn has a convex surface which is in contact with the lens-adhered mold half.

53. The method of embodiment 51, wherein the ultrasonic horn has a concave surface which is in contact with the lens-adhered mold half.

54. The method of embodiment 51, wherein the ultrasonic horn has a flat surface which is in contact with the lens-adhered mold half.

55. The method of any one of embodiments 51 to 54, further comprising a step of subjecting the unprocessed silicone hydrogel contact lens obtained in step (5) to one or more post-molding processes selected from the group consisting of extraction, hydration, surface treatment, packaging, sterilization, and combinations thereof.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Oxygen Permeability Measurements

The apparent oxygen permeability ($Dk_{app}$), the apparent oxygen transmissibility (Dk/t), the intrinsic (or edge-corrected) oxygen permeability ($Dk_o$) of a lens and a lens material are determined according to procedures described in Example 1 of U.S. patent application publication No. 2012/0026457 A1 (herein incorporated by reference in its entirety).

Equilibrium Water Content

The equilibrium water content (EWC) of contact lenses is determined as follows.

Amount of water (expressed as percent by weight) present in a hydrated hydrogel contact lens, which is fully equilibrated in saline solution, is determined at room temperature. Quickly stack the lenses, and transfer the lens stack to the aluminum pan on the analytical balance after blotting lens in a cloth. The number of lenses for each sample pan is typically five (5). Record the pan plus hydrated weight of the lenses. Cover the pan with aluminum foil. Place pans in a laboratory oven at 100±2° C. to dry for 16-18 hours. Remove pan plus lenses from the oven and cool in a desiccator for at least 30 minutes. Remove a single pan from the desiccator, and discard the aluminum foil. Weigh the pan plus dried lens sample on an analytical balance. Repeat for all pans. The wet and dry weight of the lens samples can be calculated by subtracting the weight of the empty weigh pan.

Elastic Modulus

The elastic modulus of a contact lens is determined using a MTS insight instrument. The contact lens is first cut into a 3.12 mm wide strip using Precision Concept two stage cutter. Five thickness values are measured within 6.5 mm gauge length. The strip is mounted on the instrument grips and submerged in PBS with the temperature controlled at 21±2° C. Typically 5N Load cell is used for the test. Constant force and speed is applied to the sample until the sample breaks. Force and displacement data are collected by the TestWorks software. The elastic modulus value is calculated by the TestWorks software which is the slope or tangent of the stress vs. strain curve near zero elongation, in the elastic deformation region.

Example 2

Preparation of Polymerizable Compositions

All polymerizable compositions (i.e., "formulations") are prepared at room temperature in air by blending all the components for 30-120 minutes using a magnetic stir plate. Two polymerizable compositions (Control and Testing formulations) are prepared by blending: 38 weight part units of CE-PDMS (Mn 9 KD) which has three polydimethylsiloxane (PDMS) segments linked via diurethane linkages between two PDMS segments and two urethane linkages each located between one terminal methacrylate group and one PDMS segment and is prepared according to method similar to what described in Example 2 of U.S. Pat. No. 8,529,057; 28 weight part units of TrisAm (N-[tris(trimethylsiloxy)-silylpropyl]acrylamide); 34 weight part units of DMA (N,N-dimethylacrylamide); 0.5 weight part unit of Vazo-64; zero (control formulation) or 400 ppm (testing formulation) of H-TEMPO (4-hydroxy-2,2,6,6,-tetramethyl-1-piperidinyloxy in free radical form).

Differential Scanning Calorimetry (DSC) Studies

Polymerization kinetics (or curing kinetics) of both the lens formulations prepared above is studied with DSC. The control formulation shows a mono-phase curing profile (i.e., one peak shown in the plot of Heat flow (W/g) as function of time) at a temperature of 90° C. or 100° C. The testing formulation shows a bi-phase curing profile (i.e., two peaks shown in the plot of Heat flow (W/g) as function of time) at a temperature of 90° C. or 100° C.

Cast Molding Including Curing and Post-Curing Treatment

A lens formulation is purged with nitrogen at room temperature for 30 to 35 minutes. The $N_2$-purged lens formulation is introduced into polypropylene molds and the molds are closed and placed in an oven. The oven is configured as follows: a nitrogen supply is connected to the oven through a higher flow capacity controller which can control the flow rate of nitrogen through the oven; at the exhaust line of the oven, vacuum pumps are connected to control the differential pressure of the oven.

The polymerizable compositions in the molds are thermally cured in the oven under the following conditions: (1) purging the oven for about 60 minutes by flowing nitrogen through the oven at a flow rate (e.g., 60 cubic foot per hour); (2) ramping from room temperature to a curing temperature (e.g., 90° C.) and then holding at the curing temperature for about 60 minutes while keeping nitrogen gas flow at a flow rate (e.g., 40 cubic foot per hour); and (3) cooling from the curing temperature to room temperature before opening the oven and removing the molds from the oven.

Mold Separation

Lens molds each with a molded silicone hydrogel contact lens precursor therein are mechanically opened as illustrated by FIG. 2 and described above. The molded unprocessed silicone hydrogel contact lens precursors adhere to the male mold halves.

Removing Lens Precursors from Lens-Adhered Mold Halves Molded unprocessed silicone hydrogel contact lenses are removed (i.e., "delensed") from lens-adhered male mold halves by using an ultrasonic horn welding apparatus as illustrated in FIG. 3. An ultrasonic horn made of stainless steel and having a shape shown in FIGS. 4 and 5. The ultrasonic vibration energy used in delensing is about 8 J. The trigger force is about 100 N.

The silicone hydrogel contact lenses removed from lens-adhered mold halves are subjected to extraction (with 1-propanol), hydration, packaged in phosphate-buffered saline (pH around 7.2) in a polypropylene package, and autoclaved at about 120° C. for 45 minutes. The oxygen permeability, equilibrium water content, modulus, and elongation at break of the obtained silicone hydrogel contact lenses are determined and reported in Table 1.

TABLE 1

| | SiHy Contact Lenses Cast-Molded From | |
| --- | --- | --- |
| | Control Lens Formulation | Testing Lens Formulation |
| DKc (Barrer) | 135.9 ± 2.4 | 146 ± 1.3 |
| Water % | 32.77 | 30.11 |
| Modulus (MPa) | 0.91 ± 0.02 | 0.95 ± 0.02 |
| Elongation (%) | 220 ± 43 | 199 ± 56 |

The presence of H-TEMPO in the polymerizable composition provides cast-molded SiHy lenses with an enhanced oxygen permeability (i.e., an increase of about 10 Barrers in oxygen permeability) without significant changes in mechanical properties (e.g., modulus, or elongation at break).

Example 3

Preparation of Polymerizable Compositions

All polymerizable compositions (i.e., "formulations") are prepared at room temperature in air by blending all the components for 30-120 minutes using a magnetic stir plate. Two polymerizable compositions (Control and Testing formulations) are prepared by dissolving and blending: 38 weight part units of CE-PDMS (Mn 9 KD) of Example 2; 28 weight part units of TrisAm; 34 weight part units of DMA; 0.5 weight part unit of Vazo-64; zero (control formulation) or 200 ppm (testing formulation) of H-TEMPO; and 5 weight part units of 1-PrOH (1-propanol).

Cast Molding Including Curing and Post-Curing Treatment

The lens formulation is introduced into polypropylene molds and the molds are closed and placed in an oven. The oven is configured as follows: a nitrogen supply is connected to the oven through a higher flow capacity controller which can control the flow rate of nitrogen through the oven; at the exhaust line of the oven, vacuum pumps are connected to control the differential pressure of the oven.

The polymerizable compositions in the molds are thermally cured in the oven under the following conditions: (1) purging the oven for about 60 minutes by flowing nitrogen through the oven at a flow rate (e.g., 60 cubic foot per hour); (2) ramping from room temperature to a first curing temperature (e.g., 55° C.) and then holding at the curing temperature for about 40 minutes while keeping nitrogen gas flow at a flow rate (e.g., 40 cubic foot per hour); (3) ramping from room temperature to a second curing temperature (e.g., 80° C.) and then holding at the curing temperature for about 40 minutes while keeping nitrogen gas flow at a flow rate (e.g., 40 cubic foot per hour); (4) ramping from room temperature to a third curing temperature (e.g., 100° C.) and then holding at the curing temperature for about 40 minutes while keeping nitrogen gas flow at a flow rate (e.g., 40 cubic foot per hour); and (5) cooling from the curing temperature to room temperature before opening the oven and removing the molds from the oven.

Mold Separation

Lens molds each with a molded silicone hydrogel contact lens precursor therein are mechanically opened according to the procedures described in Example 2. The molded unprocessed silicone hydrogel contact lens precursors adhere to the male mold halves.

Removing Lens Precursors from Lens-Adhered Mold Halves

Molded unprocessed silicone hydrogel contact lenses are removed (i.e., "delensed") from lens-adhered male mold halves according the procedure described in Example 2.

The silicone hydrogel contact lenses removed from lens-adhered mold halves are subjected to extraction (with isopropanol), hydration, packaged in phosphate-buffered saline (pH around 7.2) in a polypropylene package, and autoclaved at about 120° C. for 45 minutes. The oxygen permeability, equilibrium water content, modulus, and elongation at break of the obtained silicone hydrogel contact lenses are determined and reported in Table 2.

TABLE 2

| | SiHy Contact Lenses Cast-Molded From | |
| --- | --- | --- |
| | Control Lens Formulation | Testing Lens Formulation |
| DKc (Barrer) | 113.2 ± 0.2 | 122.4 ± 2.1 |
| Water % | 33.8 | 34.3 |
| Modulus (MPa) | N/A | N/A |
| Elongation (%) | N/A | N/A |

Example 4

Preparation of Polymerizable Compositions

All polymerizable compositions (i.e., "formulations") are prepared at room temperature in air by blending all the components for 30-120 minutes using a magnetic stir plate. Two polymerizable compositions (Control and Testing formulations) are prepared by blending: 41 weight part units of CE-PDMS (Mn 9000 g/mol) of Example 2; 28 weight part units of TrisAm; 31 weight part units of DMA; 0.5 weight part unit of Vazo-64; zero (control formulation) or 200 ppm (testing formulation) of H-TEMPO.

Cast Molding Including Curing and Post-Curing Treatment

The lens formulation is introduced into polypropylene molds and the molds are closed and placed in an oven. The oven is configured as follows: a nitrogen supply is connected to the oven through a higher flow capacity controller which can control the flow rate of nitrogen through the oven; at the exhaust line of the oven, vacuum pumps are connected to control the differential pressure of the oven.

The polymerizable compositions in the molds are thermally cured in the oven under the following conditions: (1) purging the oven for about 60 minutes by flowing nitrogen through the oven at a flow rate (e.g., 60 cubic foot per hour); (2) ramping from room temperature to a first curing temperature (e.g., 55° C.) and then holding at the curing temperature for about 40 minutes while keeping nitrogen gas flow at a flow rate (e.g., 40 cubic foot per hour); (3) ramping from room temperature to a second curing temperature (e.g., 80° C.) and then holding at the curing temperature for about 40 minutes while keeping nitrogen gas flow at a flow rate (e.g., 40 cubic foot per hour); (4) ramping from room temperature to a third curing temperature (e.g., 100° C.) and then holding at the curing temperature for about 40 minutes while keeping nitrogen gas flow at a flow rate (e.g., 40 cubic foot per hour); and (5) cooling from the curing temperature to room temperature before opening the oven and removing the molds from the oven.

Mold Separation

Lens molds each with a molded silicone hydrogel contact lens precursor therein are mechanically opened according to the procedures described in Example 2. The molded unprocessed silicone hydrogel contact lens precursors adhere to the male mold halves.

Removing Lens Precursors from Lens-Adhered Mold Halves

Molded unprocessed silicone hydrogel contact lenses are removed (i.e., "delensed") from lens-adhered male mold halves according the procedure described in Example 2.

The silicone hydrogel contact lenses removed from lens-adhered mold halves are subjected to extraction (with isopropanol), hydration, packaged in phosphate-buffered saline (pH around 7.2) in a polypropylene package, and autoclaved at about 120° C. for 45 minutes. The oxygen permeability, equilibrium water content, modulus, and elongation at break of the obtained silicone hydrogel contact lenses are determined and reported in Table 3.

TABLE 3

| | SiHy Contact Lenses Cast-Molded From | |
|---|---|---|
| | Control Lens Formulation | Testing Lens Formulation |
| DKc (Barrer) | 130.3 ± 2.4 | 139.1 ± 2.0 |
| Water % | 27.5 | 28.4 |
| Modulus (MPa) | 1.47 | 1.42 |
| Elongation (%) | 180 | 227 |

All the publications and patents which have been cited herein above are hereby incorporated by reference in their entireties.

What is claimed is:

1. A method for producing silicone hydrogel contact lenses, comprising the steps of:
   (1) obtaining a polymerizable composition which is clear at room temperature, wherein the polymerizable composition comprises
      (a) at least one siloxane-containing vinylic monomer,
      (b) at least one polysiloxane vinylic crosslinker,
      (c) from about 15% to about 55% by weight of at least one hydrophilic (meth)acrylamido monomer having 3 to 8 carbon atoms,
      (d) from 0 to about 25% by weight of an organic solvent having relative to the total weight of the polymerizable composition, wherein the organic solvent has 2 to 8 carbon atoms,
      (e) at least one thermal free radical initiator, and
      (f) at least one radical scavenger present in an amount for providing the polymerizable composition with a bi-phase curing profile determined by using thermal DSC to polymerization kinetics of the polymerizable composition at a curing temperature of from about 45° C. to about 100° C. as function of time;
   (2) introducing the polymerizable composition into a lens mold, wherein the lens mold comprises a male mold half having a first molding surface and a female mold half having a second molding surface, wherein the male and female mold halves are configured to receive each other such that a mold cavity is formed between the first and second molding surfaces when the mold is closed;
   (3) curing thermally the polymerizable composition in the lens mold in an oven at the curing temperature for at least 30 minutes to form an unprocessed silicone hydrogel lens contact lens;
   (4) separating the lens mold the male and female mold halves, with the unprocessed silicone hydrogel contact lens being adhered on a lens-adhered mold half which is one of the male and female mold halves; and
   (5) removing the unprocessed silicone hydrogel contact lens from the lens-adhered mold half.

2. The method of claim 1, wherein at least one hydrophilic (meth)acrylamido monomer is (meth)acrylamide, N-methyl (meth)acrylamide, N,N-dimethyl (meth)acrylamide, N-ethyl (meth)acrylamide, N,N-diethyl (meth)acrylamide, N-propyl (meth)acrylamide, N-isopropylacrylamide, N-3-methoxypropyl (meth)acrylamide, N-tert-butylacrylamide, N-2-hydroxyethyl (meth)acrylamide, N,N-bis(2-hydroxyethyl) (meth)acrylamide, N-2-hydroxypropyl (meth)acrylamide, N-3-hydroxypropyl (meth)acrylamide, N-2,3-dihydroxypropyl (meth)acrylamide, N-[tris(hydroxymethyl)methyl]-acrylamide, N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl acrylamide, 2-(meth)acrylamidoglycolic acid, or a combination thereof.

3. The method of claim 2, wherein the organic solvent is ethanol, 1-propanol, isopropanol, 1-butanol, sec-butanol, isobutanol, tert-butyl alcohol, 1-pentanol, 2-pentanol, 3-pentanol, 3-methyl-2-butanol, 2-methyl-1-butanol, 2,2-dimethyl-1-propanol, tert-amyl alcohol, 1-methoxy-2-propanol, 3-ethoxy-1-propanol, 1-ethoxy-2-propanol, or a combination thereof.

4. The method of claim 3, wherein the radical scavenger is a N-oxyl or nitroxide compound, a quinone methide, a nitroso compound, phenothiazine, phenols, or a naturally-occurring antioxidant free-radical scavenger.

5. The method of claim 4, wherein the polymerizable composition in the lens mold is thermally cured in the oven at the curing temperature under a nitrogen environment, wherein the nitrogen environment in the oven is maintained by flowing nitrogen gas through the oven at a first flow rate.

6. The method of claim 5, wherein the organic solvent has a boiling point of lower than 105° C., wherein the method further comprises, between steps (3) and (4), the steps of: raising oven temperature to a post-curing temperature of about 110° C. or higher while increasing the flow rate of nitrogen gas through the oven to a second flow rate which is at least about 2.0 folds of the first flow rate; and heating the lens mold with the unprocessed silicone hydrogel contact lens therewithin in the oven at the post-curing temperature under nitrogen gas flow through the oven at the second flow rate for at least about 30 minutes.

7. The method of claim 6, wherein the lens mold with the unprocessed silicone hydrogel contact lens therewithin is heated in the oven at the post-curing temperature for at least about 60 minutes.

8. The method of claim 7, wherein the sum of the amounts of components (a) to (d) is at least about 90% by weight relative to the total weight of the polymerizable composition.

9. The method of claim 8, wherein the step (5) of removing is performed, before the unprocessed silicone hydrogel contact lens is contact with water or any liquid, by (a) bring a ultrasonic horn in direct contact with at least one area of a non-optical surface of the lens-adhered mold half having the unprocessed silicone hydrogel lens precursor attached thereon and (b) applying a ultrasonic vibrational energy of from about 0.2 to about 18 J to the at least one area of the non-optical surface of the lens-adhered mold half having the unprocessed silicone hydrogel contact lens adhered thereon so as to remove the unprocessed silicone hydrogel contact lens from the lens-adhered mold half.

10. The method of claim 9, wherein the ultrasonic horn has a convex surface which is in contact with the lens-adhered mold half.

11. The method of claim 9, wherein the ultrasonic horn has a concave surface which is in contact with the lens-adhered mold half.

12. The method of claim 9, wherein the ultrasonic horn has a flat surface which is in contact with the lens-adhered mold half.

13. The method of claim 9, further comprising a step of subjecting the unprocessed silicone hydrogel contact lens obtained in step (5) to one or more post-molding processes selected from the group consisting of extraction, hydration, surface treatment, packaging, sterilization, and combinations thereof.

14. The method of claim 9, wherein the polymerizable composition further comprises about 10% or less by weight of one or more polymerizable components selected from the group consisting of an N-vinyl amide monomer, a hydrophilic (meth)acryloxy monomer, a hydrophobic acrylic monomer capable of forming a homopolymer with a $T_g$ of at least about 60° C., a non-silicone vinylic crosslinker, and combinations thereof, relative to the total weight of the polymerizable composition,
wherein the N-vinyl amide monomer is selected from the group consisting of N-vinylpyrrolidone, N-vinyl piperidone, N-vinyl caprolactam, N-vinyl-N-methyl acetamide, N-vinyl formamide, N-vinyl acetamide, N-vinyl isopropylamide, N-vinyl-N-methyl acetamide, N-vinyl-N-ethyl acetamide, N-vinyl-N-ethyl formamide, and mixtures thereof,
wherein the hydrophilic (meth)acryloxy monomer is selected from the group consisting of 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a weight average molecular weight of up to 1500, (meth)acrylic acid, ethylacrylic acid, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof,
wherein the hydrophobic acrylic monomer is selected from the group consisting of methyl methacrylate, ethyl methacrylate, isopropyl methacrylate, sec-butyl methacrylate, tert-butyl methacrylate, cyclohexyl methacrylate, isobornyl acrylate, isobornyl methacrylate, phenyl methacrylate, 4-tert-butylstyrene, 2-methylstyrene, styrene, 4-ethoxystyrene, 2,4-dimethystyrene, 2,5-dimethylstyrene, 3,5-dimethylstyrene, and combinations thereof.

15. The method of claim 14, wherein the polymerizable composition comprises from about 1.5% or less by weight of the non-silicone vinylic crosslinker relative to the total weight of all polymerizable components in the polymerizable composition, wherein the non-silicone vinylic crosslinker is ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, and 3,4-bis[(meth)acryloyl]tetrahydrofuan, diacrylamide (i.e., N-(1-oxo-2-propenyl)-2-propenamide), dimethacrylamide (i.e., N-(1-oxo-2-methyl-2-propenyl)-2-methyl-2-propenamide), N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamide-propane-2-yl dihydrogen phosphate (i.e., N,N'-2-phophonyloxypropylene bis(meth)acrylamide), piperazine diacrylamide (or 1,4-bis(meth)acryloyl piperazine), tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, or combinations thereof.

16. The method of claim 14, wherein said at least one siloxane-containing vinylic monomer is tris(trimethylsilyloxy)silylpropyl (meth)acrylate, [3-(meth)acryloxy-2-hydroxypropyloxy]propylbis(trimethylsiloxy) methylsilane, [3-(meth)acryloxy-2-hydroxypropyloxy]propylbis(trimethylsiloxy)butylsilane, 3-(meth)acryloxy-2-(2-hydroxyethoxy)-propyloxy) propylbis(trimethylsiloxy)methylsilane, 3-(meth)acryloxy-2-hydroxypropyloxy)propyltris(trimethylsiloxy)silane, N-[tris(trimethylsiloxy)silylpropyl]-(meth)acrylamide, N-(2-hydroxy-3-(3-(bis(trimethylsilyloxy) methylsilyl) propyloxy)-2-methyl (meth)acrylamide, N-(2-hydroxy-3-(3-(bis(trimethylsilyloxy) methylsilyl)-propyloxy)propyl) (meth)acrylamide, N-(2-hydroxy-3-(3-(tris(trimethylsilyloxy)silyl)-propyloxy) propyl)-2-methyl acrylamide, N-(2-hydroxy-3-(3-(tris(trimethylsilyloxy)silyl)-propyloxy)propyl) (meth)acrylamide, N-[tris(dimethylpropylsiloxy)silylpropyl]-(meth)acrylamide, N-[tris(dimethylphenylsiloxy) silylpropyl] (meth)acrylamide, N-[tris(dimethylethylsiloxy) silylpropyl] (meth)acrylamide, N,N-bis[2-hydroxy-3-(3-(bis (trimethylsilyloxy) methylsilyl)propyloxy)propyl]-2-methyl (meth)acrylamide, N,N-bis[2-hydroxy-3-(3-(bis(trimethylsilyloxy)methylsilyl) propyloxy)-propyl](meth)acrylamide, N, N-bis[2-hydroxy-3-(3-(tris(trimethylsilyloxy)silyl)propyloxy)-propyl]-2-methyl (meth)acrylamide, N,N-bis[2-hydroxy-3-(3-(tris(trimethylsilyloxy)-silyl)propyloxy)propyl] (meth)acrylamide, N-[2-hydroxy-3-(3-(t-butyldimethylsilyl)-propyloxy)propyl]-2-methyl (meth)acrylamide, N-[2-hydroxy-3-(3-(t-butyldimethylsilyl)propyloxy)propyl] (meth)acrylamide, N,N-bis[2-hydroxy-3-(3-(t-butyldimethylsilyl)propyloxy)propyl]-2-methyl (meth)acrylamide, N-2-(meth)acryloxyethyl-O-(methyl-bis-trimethylsiloxy-3-propyl)silyl carbamate, 3-(trimethylsilyl)propylvinyl carbonate, 3-(vinyloxycarbonylthio)-propyl-tris(trimethyl-siloxy)silane, 3-[tris(trimethylsiloxy)silyl]propylvinyl carbamate, 3-[tris(trimethylsiloxy)silyl] propyl allyl carbamate, 3-[tris(trimethylsiloxy)silyl]propyl vinyl carbonate, or a combination thereof.

17. The method of claim 14, wherein said at least one siloxane-containing vinylic monomer is tris(trimethylsilyloxy)silylpropyl (meth)acrylate, [3-(meth)acryloxy-2-hydroxypropyloxy]propylbis(trimethylsiloxy) methylsilane, [3-(meth)acryloxy-2-hydroxypropyloxy]propylbis(trimethylsiloxy)butylsilane, 3-(meth)acryloxy-2-(2-hydroxyethoxy)-propyloxy) propylbis(trimethylsiloxy)methylsilane, 3-(meth)acryloxy-2-hydroxypropyloxy)propyltris(trimethylsiloxy)silane, or a combination thereof.

18. The method of claim 14, wherein said at least one siloxane-containing vinylic monomer is N-[tris(trimethylsiloxy)silylpropyl]-(meth)acrylamide, N-(2-hydroxy-3-(3-(bis(trimethylsilyloxy)methylsilyl)propyloxy)-propyl)-2-methyl (meth)acrylamide, N-(2-hydroxy-3-(3-(bis(trimethylsilyloxy)methylsilyl)-propyloxy)propyl) (meth) acrylamide, N-(2-hydroxy-3-(3-(tris(trimethylsilyloxy) silyl)-propyloxy)propyl)-2-methyl acrylamide, N-(2-hydroxy-3-(3-(tris(trimethylsilyloxy)silyl)-propyloxy) propyl) (meth)acrylamide, or a combination thereof.

19. The method of claim 14, wherein said at least one siloxane-containing vinylic monomer is α-(meth)acryloxypropyl terminated ω-$C_1$-$C_4$-alkyl terminated polydimethylsiloxane, α-(meth)acryloxy-2-hydroxypropyloxypropyl terminated ω-$C_1$-$C_4$-alkyl terminated polydimethylsiloxane, α-(2-hydroxyl-methacryloxypropyloxypropyl)-ω-$C_1$-$C_4$-alkyl-decamethylpentasiloxane, α-[3-(meth)acryloxyethoxy-2-hydroxypropyloxypropyl]-terminated ω-$C_1$-$C_4$-alkyl terminated polydimethylsiloxane, α-[3-(meth)acryloxypropyloxy-2-hydroxypropyloxypropyl]-terminated ω-$C_1$-$C_4$-alkyl terminated polydimethylsiloxane, α-[3-(meth)acryloxyisopropyloxy-2-hydroxypropyloxypropyl]-terminated ω-$C_1$-$C_4$-alkyl terminated polydimethylsiloxane, α-[3-(meth)acryloxybutyloxy-2-hydroxypropyloxypropyl]-terminated ω-$C_1$-$C_4$-alkyl terminated polydimethylsiloxane, α-[3-(meth)acryloxyethylamino-2-hydroxypropyloxypropyl]-terminated ω-$C_1$-$C_4$-alkyl terminated polydimethylsiloxane, α-[3-(meth)acryloxypropylamino-2-hydroxypropyloxypropyl]-terminated ω-$C_1$-$C_4$-alkyl terminated polydimethylsiloxane, α-[3-(meth)acryloxy-butylamino-2-hydroxypropyloxypropyl]-terminated ω-$C_1$-$C_4$-alkyl terminated polydimethylsiloxane, α-[(meth)acryloxy(polyethylenoxy)-2-hydroxypropyloxypropyl]-terminated ω-$C_1$-$C_4$-alkyl terminated polydimethylsiloxane, α-[(meth)acryloxy-2-hydroxypropyloxy-ethoxypropyl]-terminated ω-$C_1$-$C_4$-alkyl terminated polydimethylsiloxane, α-[(meth)acryloxy-2-hydroxypropyl-N-ethylaminopropyl]-terminated ω-$C_1$-$C_4$-alkyl terminated polydimethylsiloxane, α-[(meth)acryloxy-2-hydroxypropyl-aminopropyl]-terminated ω-$C_1$-$C_4$-alkyl terminated polydimethylsiloxane, α-[(meth)acryloxy-2-hydroxypropyloxy-(polyethylenoxy)propyl]-terminated ω-$C_1$-$C_4$-alkyl terminated polydimethylsiloxane, α-(meth)acryloylamidopropyloxypropyl terminated ω—$C_1$-$C_4$-alkyl terminated polydimethylsiloxane, α-N-methyl-(meth)acryloylamidopropyloxypropyl terminated ω-$C_1$-$C_4$-alkyl terminated polydimethylsiloxane, α-[3-(meth)acrylamidoethoxy-2-hydroxypropyloxy-propyl]-terminated ω-$C_1$-$C_4$-alkyl polydimethylsiloxane, α-[3-(meth)acrylamidopropyloxy-2-hydroxypropyloxypropyl]-terminated ω-$C_1$-$C_4$-alkyl terminated polydimethylsiloxane, α-[3-(meth)acrylamidoisopropyloxy-2-hydroxypropyloxypropyl]-terminated ω-$C_1$-$C_4$-alkyl terminated polydimethylsiloxane, α-[3-(meth)acrylamidobutyloxy-2-hydroxypropyloxypropyl]-terminated ω-$C_1$-$C_4$-alkyl terminated polydimethylsiloxane, α-[3-(meth)acryloylamido-2-hydroxypropyloxypropyl] terminated ω-$C_1$-$C_4$-alkyl polydimethylsiloxane, α-[3-[N-methyl-(meth)acryloylamido]-2-hydroxypropyl-oxypropyl]terminated ω-$C_1$-$C_4$-alkyl terminated polydimethylsiloxane, N-methyl-N'-(propyltetra(dimethylsiloxy)dimethyl butylsilane) (meth)acrylamide, N-(2,3-dihydroxypropane)-N'-(propyltetra(dimethylsiloxy)dimethylbutylsilane) (meth)acrylamide, (meth)acryloylamidopropyltetra(dimethylsiloxy)dimethylbutylsilane, α-vinyl carbonate-terminated ω-$C_1$-$C_4$-alkyl-terminated polydimethylsiloxanes, α-vinyl carbamate-terminated ω-$C_1$-$C_4$-alkyl-terminated polydimethylsiloxane, or a mixture thereof.

20. The method of claim 14, wherein the polymerizable materials comprise at least one silicone-containing vinylic crosslinker which is α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylaminocarbonyloxy-ethoxypropyl]-terminated polydimethylsiloxane, α,ω-bis[(meth)acryloxyethylamino-carbonyloxy-(polyethylenoxy)propyl]-terminated polydimethylsiloxane, or a combination thereof.

* * * * *